United States Patent [19]
Zibilich, Jr. et al.

[11] Patent Number: 5,274,603
[45] Date of Patent: Dec. 28, 1993

[54] MARINE SEISMIC CABLE SECTION ASSEMBLY

[75] Inventors: Anthony M. Zibilich, Jr., Mandeville, La.; Yoram Shoham, Houston, Tex.

[73] Assignee: Shell Oil Company, Houston, Tex.

[21] Appl. No.: 737,301

[22] Filed: Jul. 29, 1991

[51] Int. Cl.$^5$ .............................................. G01V 1/38
[52] U.S. Cl. .................... 367/20; 174/101.5; 367/154
[58] Field of Search .............. 367/15, 16, 17, 20, 367/154; 181/122, 402; 174/101.5

[56] References Cited

U.S. PATENT DOCUMENTS

| | | | |
|---|---|---|---|
| H462 | 4/1988 | Zibilich | 367/19 |
| 3,281,768 | 10/1966 | Pavey, Jr. et al. | 367/21 |
| 3,344,881 | 10/1967 | White | 181/122 |
| 3,434,104 | 3/1969 | Stapleton et al. | 340/7 |
| 3,518,677 | 6/1970 | Florian | 340/7 |
| 3,696,329 | 10/1972 | Hazelhurst | 340/7 |
| 3,744,016 | 7/1973 | Davis | 340/7 R |
| 3,860,899 | 1/1975 | Watlington | 367/154 |
| 3,872,478 | 3/1975 | Lucole | 367/178 |
| 3,888,709 | 6/1975 | Burk | 156/48 |
| 3,888,710 | 6/1975 | Burk | 156/48 |
| 3,921,755 | 11/1975 | Thigpen | 181/122 |
| 4,078,223 | 3/1978 | Strange | 340/7 R |
| 4,102,716 | 7/1978 | Groves et al. | 156/48 |
| 4,241,427 | 12/1980 | Swenson | 174/101.5 |
| 4,296,481 | 10/1981 | Weiss | 367/20 |
| 4,329,442 | 5/1982 | Pokorny | 528/49 |
| 4,438,292 | 3/1984 | Woodall | 174/52 R |
| 4,533,598 | 8/1985 | Downey et al. | 428/380 |
| 4,716,260 | 12/1987 | Hoffman et al. | 174/102 R |
| 4,725,990 | 2/1988 | Zibilich | 367/15 |
| 4,736,345 | 4/1988 | Keckler et al. | 367/20 |
| 4,759,001 | 7/1988 | Keckler et al. | 367/191 |
| 4,783,770 | 11/1988 | Danbom | 367/53 |
| 4,798,853 | 1/1989 | Handlin, Jr. | 523/173 |
| 4,803,669 | 2/1989 | Airhart | 367/72 |
| 4,807,199 | 2/1989 | Yamamoto et al. | 367/15 |
| 4,870,625 | 9/1989 | Young et al. | 367/16 |
| 4,893,290 | 1/1990 | McNeel et al. | 367/178 |
| 4,942,557 | 7/1990 | Seriff | 367/15 |
| 4,951,264 | 8/1990 | Yamamoto | 367/15 |
| 4,998,227 | 3/1991 | Rygg et al. | 367/177 |

FOREIGN PATENT DOCUMENTS

| | | |
|---|---|---|
| 2145226 | 3/1985 | United Kingdom . |
| 2224121 | 4/1990 | United Kingdom . |
| PCT/NO90/-00157 | 5/1991 | World Int. Prop. O. . |
| PCT/NO90/-00158 | 5/1991 | World Int. Prop. O. . |
| PCT/NO90/-00159 | 5/1991 | World Int. Prop. O. . |

OTHER PUBLICATIONS

"New Fiber Rope Technologies Drive Increased Applications, " by G. P. Foster, *Sea Technology* magazine, Jul. 1989, pp. 15-16.

Litton Resources Brochure, "LRS-500 Streamer Cables," 1981.

*Primary Examiner*—Ian J. Lobo
*Attorney, Agent, or Firm*—Fred S. Reynolds

[57] ABSTRACT

A marine seismic cable section with stress members and internal wiring located within the cable section in a manner which reduces internal bending stresses upon the cable section when wound upon a storage reel. Stress members are at least near a horizontal plane passing through and at approximately equal distances from the center line of the cable section. Internal wiring is located in a vertical crisscrossing pattern down the length of the cable section. In one important embodiment, the cable section contains an elastomeric filler material to retain and support stress members, internal wiring and other internal components at their desired location and to prevent damage to internal wiring and components due to external stress when the cable section is wound on a cable reel. Stress relief sections are also provided to further reduce bending stress within the seismic cable section in other embodiments. Additionally embodiments to the cable section provide for adapting the cable section to a bottom cable which is laid on and couples with the sea floor to detect all three vectorial components of particle motion resulting from p- and s-waves and to detect p-waves with a hydrophone. Other embodiments provide for sealing and termination methods which are compatible with use of elastomer as a filler material for connecting detectors disposed within the cable section to internal wiring.

87 Claims, 6 Drawing Sheets

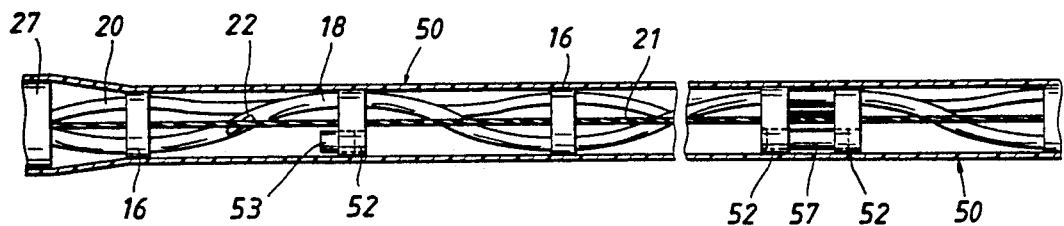
FIG. 4
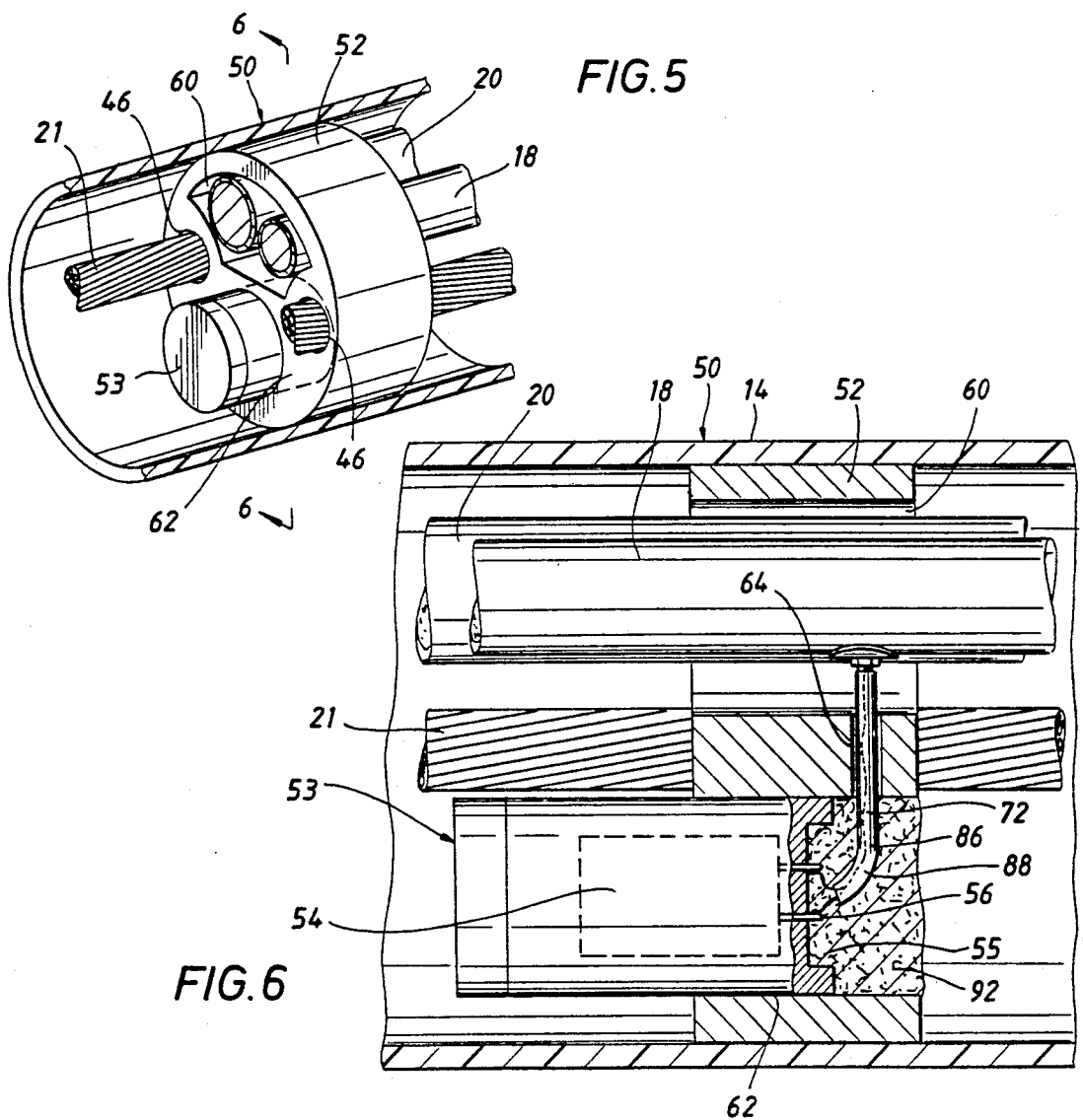
FIG. 5
FIG. 6

MARINE SEISMIC CABLE SECTION ASSEMBLY

BACKGROUND OF THE INVENTION

This invention relates generally to seismic exploration of substrata beneath bodies of water and, more particularly, to marine seismic cable used to sense compressional waves (p-waves) reflected from such substrata and/or to sense shear waves (s-waves) reflected from such substrata in response to downwardly traveling compressional or shear waves.

In very simplified terms when traveling within the earth, the seismic waves, whether generated by a compressional wave source or a shear wave source, interact with the earth media. Such interactions include reflection, transmission, refraction, and mode conversion at interfaces between materials (layers) with different densities or velocities.

The direction of particle motion caused by the seismic waves determines the type of wave produce in the earth. The downward propagating compressional waves generate reflected p-waves and converted s-waves. The downward propagating shear waves generate s-waves and converted p-waves.

The p-wave is defined to be a wave which induces particle motion back and forth in line with the direction of the wave propagation. The s-waves are defined as waves for which particle motion is back and forth transverse to the direction of the propagation. There are two independent s-waves components, which are herein called $S_1$ and $S_2$. $S_1$ and $S_2$ are perpendicular to each other.

The path of the p, $S_1$, and $S_2$ propagation could be any direction; however, since vector particle motions are involved, motion detectors aligned with the axes of an orthogonal coordinate system can be used to detect the p-waves and the s-waves within the earth. This is possible because any 3-dimensional vectorial wave field can be represented by 3 independent vectorial components which correspond to the alignment of the motion detectors. For the case of acquisition along a line, these vectorial components are defined herein to be a vertical component and two horizontal components. The two horizontal vectorial components are an inline component and a crossline component which is perpendicular to the inline component. Detectors along the vertical, inline, and crossline directions will sense individual vectorial components of the particle motion in these directions, respectively. The collected data will then have to be processed to separate it into the p, $S_1$, and $S_2$ waves.

At the bottom interface, i.e., the bottom of the sea, we have a transition from earth to fluid; an s-wave is unable to propagate in a fluid; therefore only a p-wave (compressional wave) will continue beyond this point into the fluid (the sea or other body of water). The p-wave generates a pressure field in the water which can be detected by a pressure detector, e.g., a hydrophone.

Marine seismic exploration is generally conducted by towing a seismic streamer cable at a given depth through the ocean or other body of water. The streamer is provided with a plurality of pressure sensors, such as hydrophones, disposed at appropriate intervals along its length. The pressure sensors (hydrophones) detect the p-waves produced in the water by the reflected seismic waves and provide electrical signals indicative thereof to suitable recording and processing equipment located on the seismic vessel that is towing the streamer.

In some locations due to the congestion of surface obstacles and the length of streamer cable, it is not possible to use streamer cable to collect p-wave data. Bottom cable containing pressure sensors can be laid on the bottom (the upper most surface the strata) to collect these data.

S-waves contain additional information of the nature of the substrata. However, the detection of shear waves is not practical by towing a streamer. As mentioned, shear waves do not propagate through a fluid medium, nor do pressure sensors sense particle movement.

S-waves can be detected at the bottom interface. The best means for the detection the s-waves at the bottom interface is by the placement of motion detectors on the bottom (the uppermost surface of the strata). The detectors can be aligned with the axis of an orthogonal coordinate system, such as the vertical, inline and crossline axis, although other coordinate systems are possible.

Bottom seismic cable with a plurality of motion detectors, such as geophones, disposed at appropriate intervals along its length have been used in the past to detect shear waves; for example, see U.S. Pat. Nos. 4,942,557, Marine Seismic System by A. J. Seriff, 4,725,990, Marine Shear Cable by A. M. Zibilich, and 4,870,625, Marine-Shear-Wave Detection System Using Single-Mode Reflection Boundary Conversion Technique by D. R. Young and R. C. Swenson. However, these detection methods do not obtain the completely general set of seismic wave measurements described, i.e., measurements of the pressure field and vertical, inline and crossline motion components using separate detectors within a bottom seismic cable. If these measurements were available, they would allow considerably improved data processing to determine p, $S_1$, and $S_2$ seismic waves components.

Bottom cable and streamer cable have similar construction and suffer from some of the same limitations. Both types of marine seismic cables have a protective cover (e.g., a polyurethane tube), connecting couplers, stress members and spacers. Both contain electrical components: Streamer seismic cable has detectors which typically include pressure transducers. Bottom seismic cable can contain detectors which typically include either or both pressure transducers and motion detectors. Each type of marine cable has wiring to connect to the electrical components at their termination points. Uninsulated terminations will short out if in contact with sea water; consequently an essentially nonconductive fluid (e.g., a hydrocarbon oil such as kerosene) is used in both cable types to provide insulation and prevent the entry of seawater. A section of marine seismic cable can be as much as 4 inches in diameter and over three hundred feet long, and when joined with other cable sections, the marine cable can be 4 miles or more.

The current trend in marine seismic data collection is to require seismic cables of longer lengths than were required in the past. In addition there is a need for a more robust bottom seismic cable that can operate at greater depths.

To make marine cable longer, additional seismic cable sections are added to its length. A seismic cable must be able to sustain tension forces along its length. Stress members within each seismic cable section absorb these tension loads and transfer these tension loads to the next cable.section, If they are to be interchangeable, they must be able to sustain greater tension forces. For example, as exploration depth increases, a bottom cable must be able to support the weight of the seismic cable extending below it. If the weight of the marine cable suspended from the ship becomes greater than the tension forces the cable section can sustain, the cable section will break. A streamer cable has a density close to water, so its weight in water will not be a significant factor, but as the length increases the drag forces on the cable will increase, increasing the tension forces on the cable.

The need for the seismic cable section to sustain increased tension forces requires not just finding stronger material for the stress members and the couplers because the increased tension exerted on the seismic cable section has other effects. For instant, when a seismic cable section is reeled in for storage or repair, the tension exerted on the cable at the storage reel can be enough to crush the seismic cable section.

At the cable storage reel, the tension exerted on marine cable as it is stored on the cable reel is a combination of several factors: the dry weight of cable suspended out of water; the water weight of cable which is subject to the pulling force of the cable storage reel; the drag forces on the cable; and the rocking motion of the ship as it responds to waves. All of these forces, which act longitudinally on the cable, are also transferred to a transverse force which squeezes the seismic cable section as it goes on the cable storage reel. As the cable is wound on the storage reel, the longitudinal tension force remains constant, but the transverse force becomes a cumulative transverse force on the cable, i.e., the squeezing force continues to build up as additional layers of cable are wound on top of it. The surface of a conventional oil filled seismic cable section cannot sustain a substantial lateral force. The cumulative lateral force could compress the oil filled cable so that oil seals on the cable are broken. If the forces are great enough, instrumentation within the cable can be crushed or the outer layer could rupture.

As the seismic cable section is taken up on a storage reel, since the longitudinal force remains constant, the cable is also subject to internal forces which can damage the integrity of the seismic cable section because of the unequal bending radius between the top and bottom of the seismic cable section. When the seismic cable section is bent over the cable storage reel, the bottom portion of the seismic cable section is subject to internal compression forces and the top portion is subject to internal tension forces. Wires, detectors, terminations, integrated cables, spacers, connecting couplers and stress members are subject to movement due to these forces and could break or deform. A particular problem is the movement of spacers. Current practice is to firmly attach the spacers to stress members so that they will not move under this stress. The attachment of spacers to the stress member is a costly and time consuming task in the construction of the seismic cable section and does limit the type of material that can be used as spacers because the spacers must also be able to sustain the transverse force on the cable.

Oil or some other hydrocarbon such as kerosene has a lower density than water; this is an advantage when used with streamer cable because of the additional buoyancy it offers to cable. However, an oil filled bottom cable will not completely couple to the bottom along its entire length unless additional weights are distributed uniformly throughout the cable length. This has not been practical to do in the past; consequently buoyant sections of the bottom seismic cable section can substantially reduce the effect of the coupling, i.e., the detector and the earth move jointly, of weighed sections of the cable to the bottom. Although inadequate coupling between the bottom cable and the bottom will have little effect on the upward traveling p-waves which can be detected by a pressure sensor in a fluid medium, it is of critical importance to have adequate coupling to the bottom for the detection of the particle motions. Each motion detector must be coupled to the bottom so that all components of the upward traveling vectorial wave field, i.e., the three dimensional components of the p-wave and s-waves, can be detected so that specific values of s-waves can be determined through processing of the seismic data.

There is an another effect which buoyant sections have on an oil filled bottom cable. When a bottom cable is dragged into place, tension is placed on the cable. If the density of each part of the cable is greater than the density of water, each part of the cable will be in contact with the bottom. The dragging motion will remove kinks from the cable and straighten out the cable as it is moved. When the cable comes to rest, because all of the cable is in contact with the bottom, the friction exerted between the bottom and the bottom cable will be enough to maintain tension in the cable so that it will remain straight. Specific detectors installed within the marine cable along its length can then be particularly located when wave forms sensed by those detectors are processed. If parts of the bottom cable are buoyant there may not be enough frictional forces due to insufficient bottom contact to keep kinks out of the cable or to retain the cable in a straight line after the cable comes to rest. The ability to correlate collected wave forms with a specific detector location will be impaired.

Oil filled bottom cable, because it is dragged into place for some operations, is not robust. Rocks or other debris on the bottom could rupture the cable allowing the oil to leave the cable and the water to enter shorting out the electrical connections.

SUMMARY OF THE INVENTION

It is a purpose of the present invention to provide a marine seismic cable section which has a reduced tendency to twist as the marine seismic cable section is deployed or retrieved on a storage reel.

Another purpose is to provide a marine seismic cable section which can sustain greater lateral forces than a typical oil filled seismic cable section.

An additional purpose is to provide a marine seismic cable section which can reduce internal forces placed upon the cable due to the unequal bending diameter across the seismic cable section when placed upon a storage reel.

Another purpose is to provide a marine seismic cable section which will simplify construction techniques for the placement of components internal to the seismic cable section.

An additional purpose is to provide in certain embodiments a bottom seismic cable section which has a density greater than water along its entire length providing continuous coupling of the cable to the bottom.

Another purpose is to provide in certain embodiments a bottom seismic cable having motion detectors configured in such a manner that they will detect the vectorial components of the p- and s-waves on an orthogonal coordinate system such as a vertical, inline, and crossline coordinate system. This configuration, which may also include an adjacent pressure detector will provide data which through processing will yield separate information for p and s-waves such as velocities and cross sections.

An additional purpose is to provide a more robust bottom cable that is, better able to withstand damage due to bottom conditions as the cable is dragged into place.

Another purpose is to provide a marine seismic cable section which substantially reduces the volume of oil placed in a marine seismic cable section.

In accordance with the some of the purposes of the present invention, there is provided a marine seismic cable section having internal wiring and support for stress members positioned in a manner such that: the seismic cable section will resist twisting as the seismic cable section is deployed or retrieved due to the longitudinal arrangement of the stress members which are supported on opposite sides and approximately equal distances from the center line of the seismic cable section; the positioning of stress members approximately on a horizontal plane passing through the center line of the seismic cable section reduces internal stresses between the stress members and their support within the seismic cable section when the seismic cable section is subject to transverse bending stress such as when the seismic cable section is placed on a storage reel; the positioning of internal wiring within the seismic cable section in a vertical crisscrossing pattern reduces internal stresses upon the internal wiring when the seismic cable section is subject to transverse bending stress such as when the seismic cable section is placed on a storage reel.

In a preferred embodiment of the invention additional purposes are met by providing an elastomeric filler material for support of stress members and internal wiring within the seismic cable section whereby: the filler material is a flexible support which prevents the diameter of the seismic cable section from collapsing under a transverse force on a storage reel thereby preventing internal damage to the seismic cable section; the filler material depending, upon the composition used, can have a density which is close to the density of water so that the filler material is compatible with use as a filler material in a streamer seismic cable section or have a density greater than water, providing a bottom cable seismic cable section with a density greater than water along the entire length of the body; the filler material being initially pliable, that is soft or pourable, can fill the internal voids of the seismic cable section, replacing the need to use a liquid insulating filler material to prevent water intrusion into the seismic cable section as practiced by prior art; the filler material upon setting becomes a flexible solid allowing the filler material to support the stress members and internal wiring without the requirement of spacers to provide the primary means of support for internal wiring and stress members as required by a liquid insulating filler material; and the solid filler material surrounds the internal wiring and stress members providing a more robust seismic cable section which is not easily ruptured when used as a bottom seismic cable section.

The typical seismic cable section has couplers by which the seismic cable section joins with other seismic cable sections and external instrumentation packages to form a marine seismic cable. Additional embodiments of the present invention provide methods to connect internal wiring and stress members to the couplers to enhance the ability of the seismic cable section to withstand bending stresses. For example, in a typical seismic cable section there is a connection between the internal wiring in the form of a wire bundle and/or an integrated cable directly to the coupler. Embodiments of the present invention are presented which have, an interconnection between the coupler and the wire bundle and/or the integrated cable. A transition plug is used as a part of this interconnection which in turn has wiring between the transition plug and the coupler adapted to withstand a larger bending movement than would be experienced by the center portion of the seismic cable section. Similarly, stress members can also be connected to a transition plug with stress relief members used between the transition plug and the coupler which can withstand a greater bending movement then would be experienced by the central portion of the seismic cable section.

The typical seismic cable section also has detectors disposed along its length for the sensing of wave forms. Embodiments are presented which adapt the seismic cable section to detect the motion of particles caused by the p-wave and the s-waves within the earth. Embodiments for detection of particle motion include: a motion detector placed adjacent to the lower most portion of the cable and held in place by the elastomeric filler material, bottom spacers which act to hold and couple a motion detector to the bottom, an inline mount which aligns a motion detector so that it can detect vectorial components of p- and s-waves along the length of the bottom cable section, crossline mounts which include a gimbal so that the motion detector can be aligned for detecting vectorial components of p- and s-waves which move across the width of the bottom cable in either the vertical or horizontal direction.

Other embodiments of the present invention are provided to position detectors within the body of the cable section and to connect detectors to the wire bundle so that the detected wave forms can be sent outside of the seismic cable section for processing. These embodiments also relate to sealing the wire bundle after a connection wire has passed through an opening in the wire bundle cover and to various connection methods which are compatible with the use of an elastomer as a support and filler material.

These and other objects and advantages of the present invention will no doubt become apparent to those of skill in the art after having read the following detailed description of the preferred embodiments which are contained herein and illustrated by the various figures.

The invention encompasses the heretofore described preferred embodiments as well as other embodiments as are described hereinafter and as will be apparent to those of skill in the art.

BRIEF DESCRIPTION OF THE DRAWINGS

FIG. 4 is a side partial cross sectional view of an embodiment of the present invention adapted for use to detect particle motion of p- and s-waves;

FIG. 5 is a perspective view of a spacer adapted for use in the bottom cable embodiment of the present invention;

FIG. 6 is an side partial cut away view taken at section 6—6 of the spacer shown in FIG. 5;

DETAILED DESCRIPTION OF THE PREFERRED EMBODIMENTS

Figure 1:
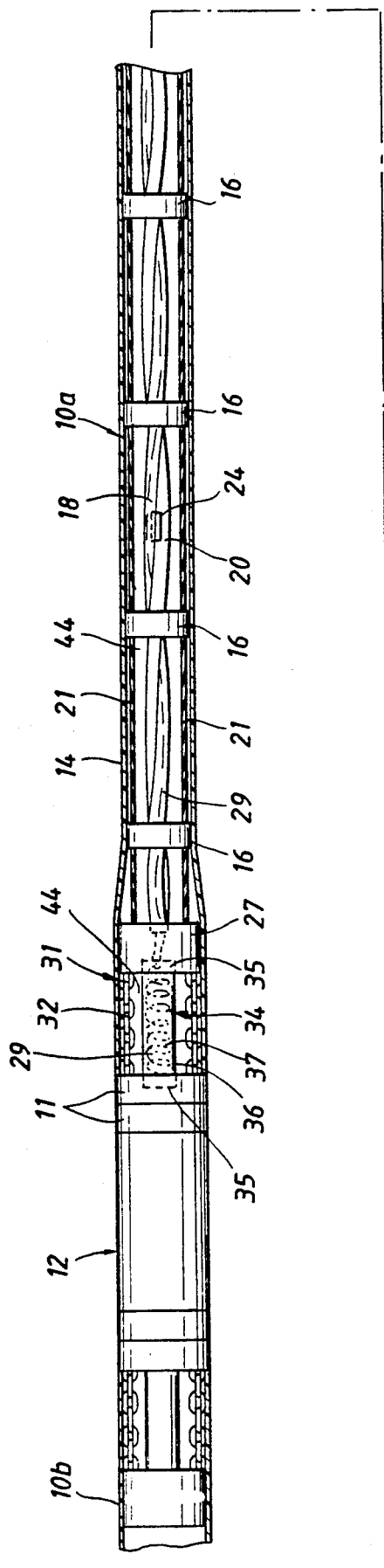
FIG. 1 is a top partial cross sectional view of one particular embodiment of the present invention connected between an instrumentation package and another section of the present invention.
Figure 1:
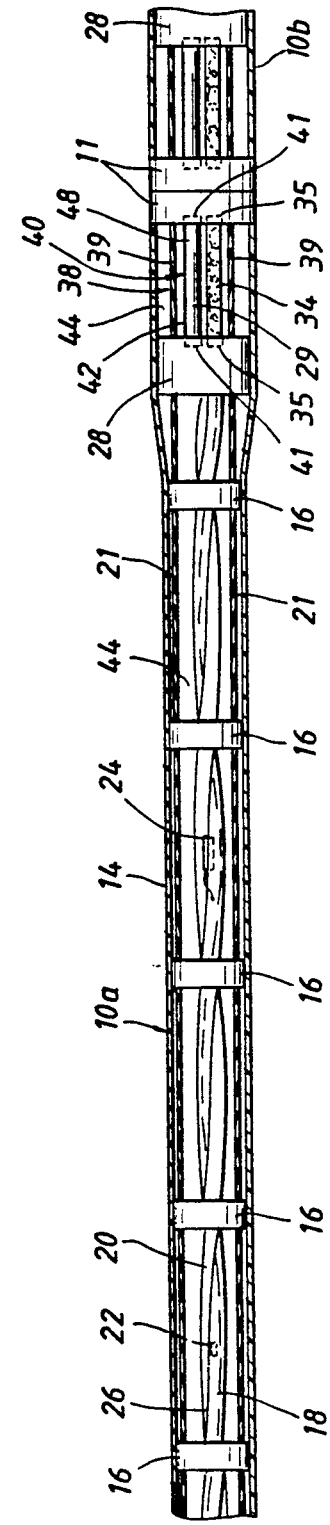

Referring to FIG. 1, a representative cross sectional top view of marine seismic cable section, 10a, is shown. The seismic cable section 10a has components within (e.g., detectors) which facilitate the sensing of wave forms produced artificially or naturally in the vicinity of the seismic cable section 10a. The seismic cable section has a coupler 11 at each end to connect the seismic cable section 10a to an adjacent component which can be another seismic cable section, shown as cable sections 10b or an instrumentation package 12 whereby, through the couplers power is supplied to the seismic cable section; the sensed wave forms are sent out side of the seismic cable section for processing; and tension on the seismic cable section is coupled to the adjacent component. The instrumentation package 12 is adapted to process and to return signals detected by seismic cable sections 10a to a collection point on a ship.

The seismic cable section 10a is shown to have an outer cover 14, commonly made of a flexible material such as polyvinyl chloride (PVC) or polyurethane.

The interior of the seismic cable section 10a is shown to include spacers 16, a wire bundle 18, an integrated cable 20 and stress members 21.

Stress members 21 are located on each side of a longitudinal plurality of wires. The longitudinal plurality of wires are shown in FIG. 1 to include the wire bundle 18 and the integrated cable 20. The longitudinal plurality of wires have electrical continuity with couplers 11. The longitudinal plurality of wires are connected to detectors 22, 24 and through connections between the detectors and wiring, form a network to collect wave forms.

Stress members 21 are shown passing through spacers 16. Stress members absorb and transfer through connections to the coupler 11 tension loads placed upon the seismic cable section 10a. A common stress member 21 used is twisted strands steel cable. However, the stress member 21 can be of any composition and structure which can withstand the tension loads placed upon the entire length of the marine cable during data retrieval, deployment and retrieval operations. If weight is a factor, for example when seismic cable section 10a is used for streamer operations, braided Kevlar (poly-p-phenylene terephthalamide) a product made by E. I. Du Pont De Nemmours and Co., Wilmington, Del., or polyester ropes could be used for stress member 21.

Wire bundle 18 provides wiring along the length of the seismic cable section 10a for the termination of instrumentation and detectors which are placed along the length of seismic cable section 10a and outside of wire bundle 18. The wire bundle 18 also provides a wire path for the detected wave forms within the seismic cable section 10a, and, through connections to coupler 11, the detected wave forms are passed out of seismic cable section 10a. Wire bundle 18 can also includes a wire bundle cover 26 which encloses the wiring and also incldudes, if present, inline detectors which are located among the wiring. For example, in FIG. 1, an inline detector 22 is shown, the detector is typically a pressure transducer. An inline pressue transducer, when used, is usually a hydrophone which is used to detect compressional (p-waves) waves.

The wire bundle cover 26 is usually made of the same or similar material as the outer cover 14. The cover 26 may preferably enclose within the wire bundle 18 a filler material 29 such as oil, kerosene or some other nonconducting fluid.

Referring again to FIG. 1, seismic cable section 10a may also include a detector or instrumentation which is too large to fit within the wire bundle 18 such as a specialized transducer, transponder or motion detector. Provision may be made in the present invention, as shown in this embodiment by detector 24 which is located outside of wire bundle 18, to connect detector 24 to wire bundle 18 by connections through the wire bundle cover 26.

The integrated cable 20 when included in a seismic cable section 10a is used to supply power and carry signals between various instrumentation packages 12. It can also be used through interconnections within cable section 10b: as a means to supply power to the wire bundle 18, as an additional path for sensed wave forms from the wire bundle 18 to travel within seismic cable section 10a, and as a path to pass wave forms sensed by cable section 10a to leave seismic cable section 10a through connections to coupler 11.

The sensed wave forms on the wire bundle 18 and the integrated cable 20 have to leave seismic cable section 10a through coupler 11 so that the sensed wave forms can be processed. In addition the stress members 21 must transfer tension loads to the coupler 11 at each end of seismic cable section 10a; therefore, they must be structurally connected in some manner to couplers 11. A direct connection of stress members 31, wire bundle 18 and integrated cable 20 to a coupler 11 can be used; however, bending stresses at couplers 11 of seismic cable section 10a can result in the failure of the seismic cable section 10a. In a preferred embodiment (hereinafter described in detail) of the present invention, instead of a direct connection of the wire bundle 18 or the integrated cable 16 to coupler 11, or a direct connection of the stress members 21 to coupler 11, a structural continuum and an electrical continuum are used which include components which are designed to withstand bending stress.

Included with these components is a transition plug, shown on FIG. 1 as 27 and 28. In this specification of the present invention a transition plug can perform the same functions as a direct connection of stress members 21, integrated cable 20 and wire bundle 18 to a coupler 11. Consequently, the transition plug could have any one or all of the following characteristics. It may act as a barrier for the termination of a wire bundle cover oil seal or an integrated cable cover. It can function as a connection point for stress members. Wire bundle 18 and integrated cable 20 may terminate to a transition plug. Additionally, it can also function as an interconnection point between an integrated cable and a wire bundle. The transition plug may also contain an electronics package. The electronics package could convert, amplify, or digitize signals from the wire bundle 18.

Connecting couplers 11 and instrumentation packages 12 can vary in length and diameter, but they do have a common feature. They do not bend, and consequently, as they are taken up on a storage reel (hoisting drum), additional stresses are placed upon the end portions of seismic cable section 10a as the seismic cable section 10a bends to contact the storage reel. An instrumentation package 12 places the greatest stress upon seismic cable section 10a because of its length. The increased bending to which the seismic cable section 10a must respond to at this location could exceed the breaking point of stress member 21 if it was connected to a coupler 11. In addition, this large bending movement could rupture wires in a wire bundle 18 and/or the integrated cable 20.

Figure 2:
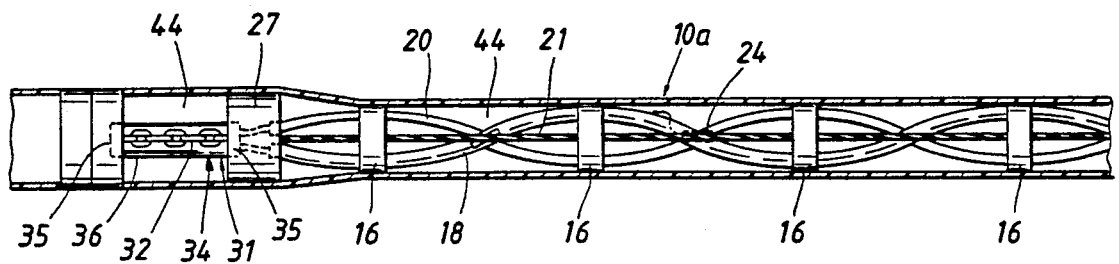
FIG. 2 is a side partial cross sectional view of the embodiment of FIG. 1.

To compensate for this bending stress in a preferred embodiment, the structural and electrical continuum is shown as a stress relief section 31 at one end of seismic cable section 10a on FIG. 1 and on FIG. 2 which is a side view of a portion of FIG. 1. It includes transition plug 27, stress relief members 32 and a slack wire bundle 34. Stress members 21 can be terminated on one side of transition plug 27 by compression, bolts, welding or other means known to the art. Stress relief members 32 are shown located between coupler 11 and transition plug 27. Provision is also made for the integrated cable 20 and wire bundle 18 to terminate to one side of transition plug 27 and interconnect therein to have a common output connection 35 for the slack wire bundle 34 as shown in FIG. 2. A slack wire bundle connection 35 is also provided for on coupler 11. Preferably, both slack wire bundle connections 35 should be centrally located to minimize bending stress on the slack wire bundle 34 which is connected between them. the slack wire bundle 34 includes a slack wire bundle cover 36 and wiring which is enclosed by the slack wire bundle cover 36. The slack wire bundle cover 36 can be made of the same material as used for wire bundle cover 26. Preferably, slack wire bundle cover encloses wire bundle 34 as well as a filler material 29 such as oil, kerosene or some other nonconducting fluid. A preferred method of placing wiring in the slack wire bundle cover 36 is to coil the wiring so that the length of coil 37 wiring is longitudinal with the length of seismic cable section 10a as shown in FIG. 1.

A chain is used as a stress relief member 32 in the above example since it can sustain tension forces yet have maximum movement at the major stress points. The chain can be either welded onto the coupler and transition plug or connected with eyebolts or like means. Other material and types of connections can be used, for example Kevlar, can be used as a material. However, in the preferred embodiment, two stress relief members 32 are used, such that, with seismic cable section 10a extending horizontally, stress relief members 32 are located longitudinally along stress relief section 31 and with each stress member 32 located at least near a horizontal plane passing through the center line of seismic cable section 10a with each stress member 32 on opposite sides and approximately the same distance from the center line as shown in FIGS. 1 and 2.

FIG. 1 shows a typical method for connecting seismic cable sections together where two sections of seismic cable share one instrumentation package 12. Consequently, each seismic cable section 10a using this configuration will have at one end in the preferred embodiment a stress relief section 31 as described when seismic cable section 10a is connected to an instrumentation package 12. However, if seismic cable section 10a is to be connected to an adjacent component which does not require a single electrical connection another configuration may be preferable.

For example in FIG. 1, seismic cable section 10a is shown joined to another seismic cable section 10b by couplers 11 (no intervening instrumentation package). Although the bending stress may not be as great as when a connection is made to an instrumentation package 12, there is a requirement for two separate electrical connections through coupler 11 and provision is also made in the preferred embodiment for seismic cable section 10a to have stress relief as provided by another form of structural and electrical continuum as represented by stress relief section 38.

Stress relief section 38 includes transition plug 28, stress relief members 39, a stress relief wire bundle 40, and a slack wire bundle 34.

In the example shown in FIG. 1, transition plug 28 provides a termination connection for wire bundle 18, integrated cable 20, and stress members 21. Transition plug 28 also has connections for a stress relief wire bundle 40 and a slack wire bundle 34 which are electrically continuous with the wire bundle 18 and the integrated cable 20, respectively. Stress relief wire bundle connection 41 and slack wire bundle connection 35 are also provided on coupler 11. Preferably, the connections 41, 35 at both locations should be centrally located to minimize bending stress on the slack wire bundle 34 and stress relief wire bundle 40 after they are connected between coupler 11 and transition plug 28. Stress relief members 39 which can sustain greater stress loads than stress members 21 are connected between transition plug 28 and coupler 11. Preferably, only two stress relief members are used and the preferred alignment of stress relief members within stress relief section 38 is as described for stress relief members 32.

Stress relief wire bundle 40 includes a stress relief wire bundle cover 42 and also includes wiring which is enclosed within the wire bundle cover in a slack manner. When the stress relief wire bundle 40 is bent, the additional slack of the wires allows the wires to move to compensate for tension placed upon the stress relief wire bundle 40 as a result of the bending. The stress relief wire bundle cover 42 can be made of the same material as used for wire bundle cover 26. Preferably, stress relief wire bundle cover 42 also encloses with stress relief wire bundle 40, a filler material 29 such as oil, kerosene or some other nonconducting fluid.

A body member 44, shown in FIG. 1, comprises a filler material which fills the remaining internal volume of seismic cable section 10a. In prior art, the preferred filler material is an insulating liquid; however in the preferred embodiment of the present invention, the preferred filler material used provides support for wire bundle 18, integrated cable 20, spacers 16, stress members, detector 24 located outside of wire bundle 18, stress relief sections 31, 38 and additional cable components.

The preferred filler material used within seismic cable section 10a is a pliable resin, that is, a liquid or soft resin, which upon setting becomes a solid elastomeric material.

In a preferred embodiment, after internal components of seismic cable section 10a have been assembled according to the desired configuration, the outer cover 14 is then installed. Openings are made in outer cover 14 to facilitate pouring a liquid resin (e.g., a polyester resin) into seismic cable section 10a. The liquid resin should be able to set at room temperature and preferably, not be water soluble after it has set. Upon hardening it should form an elastomeric material which is flexible along its length and be able to sustain lateral loads transverse to the length of the cable to protect against crushing of internal seismic cable section components.

Other methods of applying a resin filler material will be apparent to those of skill in the art. One method is to use a tube to retain the liquid resin which covers only a portion of the assembled seismic cable section 10a without outer cover 14 and to move the tube to an unfinished section after the resin sets in the completed portion. A second method is to form the body member of seismic cable section 10a with a soft resin after the internal components are assembled. A third is to use an extruding process to apply filler material around the completed internal assembly. It should be noted that in these alternate methods to make the seismic cable section an outer cover is not used.

The density of the body member 44 in some preferred embodiments of the streamer cable section and the bottom cable section using the preferred filler material, upon hardening, should be uniform with no air pockets or localized variations in density. A uniform density for a body member is important for a typical streamer cable which uses omnidirectional pressure sensors. Because of surface noise, each pressure transducer should be susceptible to the same attenuation factors for the compressional waves which are detected.

However, a constant density of filler material across the width of the body member may not be the best design in some applications. In order to change the density of the filler material across the width of the cable section the preferred filler material would consist of combinations of resins with different properties. The following examples provide some of the applications of using filler material with different properties within the body member in combination or in separate areas of the body member: providing an area around a directional sensor which has different absorption characteristics than the filler material used in the remainder of the body; providing a filler material which would have better long term wear resistance locally than the remaining filler material within the cable section to the effects of the bending of the filler material around the instrumentation when the cable is placed on a storage reel or to the effects of dragging the cable section against the bottom; or providing a filler material around a motion detector which has better coupling characteristics between the motion sensor and the vectorial components of p- and s-waves than the remaining filler material. Additionally, if directional sensors (such as directional pressure sensors or motion detectors) are used it is possible to vary the density of the filler material so that the cable under tow or sitting on the bottom will have more stability to maintain a preferred orientation by making the lower most portion of the body member with a higher density filler material than the density of the filler material above the lower most portion of the body member. As mentioned previously, if pressure sensors are used, each pressure sensor used for that specific purpose, preferably, should be subject to the same attenuation factors, i.e., if the density of the filler material is varied then the variation in density should be consistent around each pressure sensor.

The specific gravity of the resin (or combined specific gravities if more than one resin is used) in the filler material varies according to the application of the seismic cable section. For example, a streamer seismic cable section, preferably has a filler material with a specific gravity close to 1.0 or less than one. The major concern is to chose a filler material which when installed in the seismic cable will provide a total specific gravity for the entire seismic cable (i.e., the filler material, the detectors, the stress members, the wiring etc.) so that the streamer cable when towed will be able to maintain the required depth. A bottom seismic cable section having a body member 44 with a filler material that has a higher specific gravity would assure that the bottom cable section had a density greater than water along its entire length, If additional weight is to be added at specific locations to ensure adequate localized coupling of the bottom seismic cable and the overall specific gravity of the bottom cable is greater than the density of water then a filler material with a lower specific gravity may be used when the total weight of the bottom cable with the use of a higher specific gravity filler material would present a deployment or retrieval problem.

Some materials which have been found to have the properties preferred in an elastomeric filler material are polyurethane, polyester, polypropylene, ethylene-propylene copolomer and polyurethane foams. Although polyester resin or polyurethane resin are the most commonly available resins to use for this application, it is realized that there may be other materials that may meet the characteristics of preferred filler material for this specification such as an epoxy mixed with a foaming agent. This specification is meant to encompass those materials of like characteristics, that is, a pourable or soft substance in an initial condition which can be used to fill the voids in a seismic cable section 10a, and upon setting becomes a flexible solid, i.e., an elastomer, which preferably is not water soluble.

One filler material that has been found to provide the above characteristics for a bottom seismic cable section (to be discussed hereinafter) is the two part resin, Conathane TU-700, part A containing dicyclchexylmethane-4,4'-diisocyanate and part B containing diethyltoluene diamine 68479-98-1, a product of Conap Inc., 1405 Buffalo St., Olean, N.Y. 14760.

The general configuration of FIGS. 1 and 2 is suitable for both a streamer seismic cable section and a bottom seismic cable section; however, some additional components are necessary to adapt a bottom seismic cable section to detect vectorial components of p- and s-waves. Additionally, for a streamer cable built according to this invention, inline detector 22 and detector 24 if they are omnidirectional pressure transducers are, preferably, placed as close to the center of the streamer seismic cable section as possible, as shown in FIGS. 1 and 2. This will allow for maximum attenuation of noise caused by the movement of the streamer cable through the water. This requirement is helpful but not necessary for a bottom seismic cable section since the cable will be at rest when operating and not subject to surface noise.

Because density is a major factor in the construction of a streamer seismic cable section, as mentioned earlier, the average density of the entire cable section can be reduced by the use of Kevlar, polyester ropes or other low density material for stress members 21. In addition, the diameter of the wire bundle cover 26 can also be increased so that the seismic streamer cable contains more oil or other insulating liquid 29 which has a density less than water.

FIG. 2 shows that, in a configuration such that with the seismic cable section 10a resting upon a horizontal surface, the integrated cable 20 and the wire bundle 18, preferably, form a vertical crisscrossing pattern which rises above and falls below the center line of the seismic cable section along the length of seismic cable section 10a. Spacers 16 can be used to provide support for the vertical crisscrossing during construction. The vertical crisscrossing is done to prevent wire and integrated cable breakage due to tension and compression forces as seismic cable section 10a is wound on a reel. The vertical crisscrossing results in making the total length of wire bundle 18 and integrated cable 20 longer than seismic cable section 10a, consequently more slack within wire bundle 18 and integrated cable 20 is available per seismic cable section 10a length for wire and/or for cable movement within the envelope provided by the wire bundle cover 26 and the cover of the integrated cable 20.

Another reason for the vertical crisscrossing of internal wiring is to isolate compressional and tension forces on the wire bundle 18 and the integrated cable 20 along the length of seismic cable section 10a. Since the wire bundle 18 and the integrated cable 20 pass back and forth in a vertical direction across the center line, compressional and tension forces on the wire bundle 18 and the integrated cable 20 will vary along the length of seismic cable section 10a as it is wound on a cable reel; and as a result compressional and tension forces will be localized along the length. The localized portions of the wire bundle 18 and the integrated cable 20 under compression will allow some wire movement to the localized areas under tension to relieve the localized stresses on the wire; consequently, the bending of seismic cable section 10a on a cable reel does not significantly increase tension forces within the wire bundle 18 or the integrated cable 20.

In the prior discussion, the vertical crisscrossing of wire bundle 18 and integrated cable 20 down the length of the cable section has revealed a significant advantages over prior art; however, there are additional advantages over prior art with regard to connections between wire bundle 18 and detectors. A wire bundle 18 is used to connect individual wires to electrical components. Some of these components could be outside of the wire bundle cover. In prior art, a significant amount of slack was required to ensure that when the seismic cable section is bent on a storage reel the connection wire could respond to a tension force, that is, move to compensate. If there was not enough slack on the connection wire to compensate for the applied tension, the connection wire could break or tear off of the termination point. Preferred embodiments of the present invention, with vertical crisscrossing of internal wiring, have reduced total local wire movement because the compression and tension forces are localized; therefore connection wire terminations can be made with less slack than used in prior art.

The present invention, in particular embodiments, also provides another advantage in this area over the prior art. As discussed, tension on the seismic cable section is also transferred to a lateral force at the cable reel which can result in causing the diameter of prior art seismic cable section to collapse. This collapse of the diameter would bind wires in wire bundle 18 so that they were also subject to the longitudinal tension force on the seismic cable section, not just the horizontal force. Since the binding of the wires prevent the wires from moving to compensate for the longitudinal tension force, the wires would break. The body member 44 using the preferred filler material of the present invention can sustain substantial lateral force; therefore tension applied to a cable as it is being wound on a cable reel will not cause the diameter to collapse; consequently, the wires in a cable bundle will not bind, thus allowing wiring within a wire bundle 18 or an integrated cable 20 to move in response to longitudinal tension forces.

Some small movement within body member 44 of the wire bundle cover 26 and integrated cable 20 is also desired. The wire bundle cover 26 and integrated cable 20 preferably adjust as the body member 44 using the preferred filler material grows or shrinks small amounts due to temperature, pressure variations and longitudinal tension forces as discussed above. Although not found to be a problem with some filler materials tested, the body member using the preferred filler material upon setting could bind to the integrated cable 20 or the wire bundle cover 26. To prevent binding when some types of preferred filler material are used, the outside of the integrated cable 20 and the wire bundle cover 26 can be coated with a material such as oil or grease that will prevent the filler material from binding to it. This will ensure movement of the integrated cable 20 and the wire bundle cover 26 within the body member 44.

Figure 3:
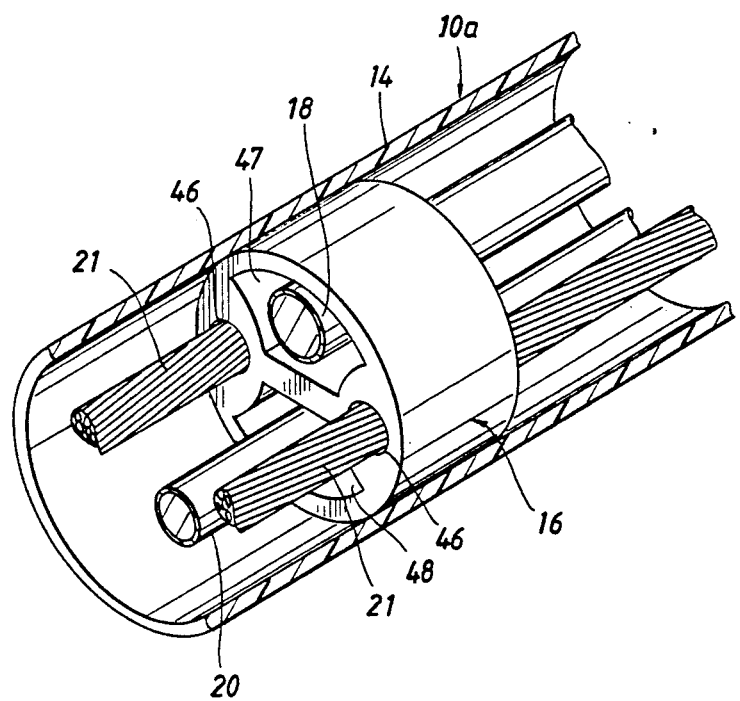
FIG. 3 is a perspective view of a spacer suitable for use in an embodiment of the present invention.

Referring now to FIG. 3, spacer 16 is shown. In a preferred embodiment, spacer 16 is used to support the cable cover 14 and to hold internal components in place until the filler material in body member 44 sets. Preferably, this type of spacer 16 is also used in those portions of a bottom seismic cable section which do not have a movement detector (to be discussed hereinafter). Spacer 16 has a diameter substantially the same as the interior diameter of the seismic cable section cover 14. Stress member passages 46 are provided for stress members 21 to pass through. In this preferred embodiment, the stress member passages are located such that with the seismic cable section 10a extending horizontally, two stress member passages are located longitudinally within the spacer in a configuration such that the stress member passages are at least near a horizontal plane passing through the center line of seismic cable section 10a with each stress member passage 46 also located approximately an equal distance from the center line. Stress members passages 46 are used to hold stress members 21 in place at their preferred location until the elastomeric body member 44 sets.

It is possible for more than two stress members to be used to construct a seismic cable section, the most likely case would be, with the seismic cable section extending horizontally, for an even number of stress members to be used, with half of the stress members located on each side of the horizontal center line of the cable with all stress members located at least near a horizontal plane extending through the center line.

The diameter of the stress member passages 46 is substantially the same as the diameter of the stress member 21 in the preferred embodiment. The stress members 21, if a twisted strands cable or twisted rope is used, are placed through the stress member passages 46 in a counter-lay (right lay/left lay) configuration as shown in FIG. 3. The use of a counter-lay configuration for twisted strands stress members in the seismic cable section 10a of the preferred embodiment will counteract the internal torquing force of twisted cable or rope which acts to cause the seismic cable section to turn about its axis when under tension. If braided stress members are used, this phenomena of twisting is not present.

In addition, in the preferred embodiment with seismic cable section 10a extending horizontally, the use of two stress members 21 in a configuration such that the stress members 21 are positioned at least near a horizontal plane which extends through the horizontal center line of the seismic cable section 10a with each stress member also being located approximately an equal distance from the center line will have two effects, provided the internal torquing forces are canceled. First, the configuration will tend to keep the cable from turning about its axis as it is deployed or reeled in because the longitudinal tension on the cable is distributed approximately equally on both stress members due to the stress members being located approximately an equal distance on opposite sides of the horizontal center line of the cable. This feature is discussed in more detail hereinafter. Second, the placement of stress members 21 in the seismic cable section 10a at least near the horizontal plane passing through the center line of the seismic cable section 10a reduces the substantial unequal internal forces which would be imposed upon the body member 44, the spacers 16 and the couplers due to the unequal bending radius of the cable section when placed on a cable storage reel.

The unequal internal forces can be explained using the example of a three stress member seismic cable section having a diameter approximately 3.5 inches and using steel cables as stress members, equidistant apart with one stress member at the top. As the cable is bent on the cable storage reel, the longitudinal tension remains on the cable with the bending radius of the lower portion of the seismic cable section being greater than the bending radius at the top portion of the seismic cable section. The stress members have no slack in them nor are they compressible. Therefore, the top stress member will be under tension seeking to move laterally downward through the filler material and the two lower stress members will be under a compression force seeking a weak point to bend into the filler material. The same stresses will be imposed on the spacers. Additionally, the top stress member will exert a constant tension force on the coupling, whereas the lower stress members will exert a compression force on the coupling. Even if the stress members are not steel cable but polyethylene rope it can be seen that over time this will degrade the internal structure of the seismic cable section.

One of the purposes for the configuration of the stress members in the preferred embodiment is to reduce internal stress on the cable, the use of two stress members 21, aligned in a seismic cable section 10a as described, will allow the formation of a marine cable having sections connected together such that if the entire length of marine cable were extended horizontally, the stress members of each cable section would also lie approximately on a horizontal plane which passes through the horizontal centerline of the marine cable. However, the cable must be able to maintain the position of the stress members in a low internal stress configuration, i.e., the stress members remaining near a horizontal plane, as it goes on a cable reel. If the cable were to twist, there would be no advantage in using this configuration.

However, the marine cable made of seismic cable sections using two stress members of the preferred embodiment will substantially reduce the tendency of the cable to twist because the longitudinal tension within the cable is on both sides of the horizontal plane which passes through centerline of the cable, therefore with this configuration the longitudinal tension forces within the cable are substantially equal. The two stress members 21 will tend to prevent twisting as the cable goes on the storage reel because twisting will result in unequal bending radiuses for the stress members. Unequal bending radiuses result in different tension forces on each stress member. For example, assume that one stress member goes on the cable storage reel high with respect to the other stress member. The stress member on the high side will have a substantial tension force on it because it is still in tension between the coupler on the reel and the coupler on the trailing cable, as discussed previously. The lower stress member will experience a much smaller tension force exerted between the couplers. The larger tension force on the upper stress member causes an increased transverse force on that stress member to pull the stress member toward the center of the cable storage reel. The lower stress member is unable to exert an opposing force on the other side of the center line of the cable section to oppose the transverse force of the upper stress member. Consequently, the cable section twists until the transverse forces are equal on both sides of the center line. The transverse forces are approximately equal when both stress member lay on the cable storage reel side by side. By this mentioned method the internal tension forces on the stress members are equalized at the point the cable goes on the cable storage reel.

The property of the preferred configuration to cause the internal forces on the stress members to equalize as the cable section goes on the cable storage reel will ensure that the cable section, as it goes on the reel, will maintain the stress members near a "curved plane" passing through the centerline of the cable section. The "curved plane" also has the characteristics of being approximately in parallel with the center of the cable storage reel. The term "curved plane" is used to indicate that although the structure of the cable section has been described with relation to a horizontal surface, when the cable section is placed on a cable storage reel the term horizontal plane not longer applies to describe the relationship of the stress members to the center of the storage reel. The stress members and the center line of the cable section are then approximately located on a curved plane surface which is in parallel with the center of the cable storage reel and in this configuration the stress members would be subject to the same amount of bending stress.

The placement of the two stress members approximately on a horizontal plane, i.e., when the cable section in on a horizontal surface, passing through the center line of the seismic cable section 10a will not remove all effects of the unequal bending radius of seismic cable section 10a, but will ensure that the stress members exert the same stress on the coupling because their bending radius is the same. In addition, since neither stress member is at the top or at the bottom of the seismic cable section as it bends on a cable reel, the internal longitudinal forces which tend to cause the stress member to try to move into the body member 44 to weaken it or to separate from spacer 16 is substantially reduced.

FIG. 3 shows a top aperture 47 and a bottom aperture 48 for spacer 16. The exact shape and size of each aperture is not critical as long as they are large enough to allow passage of the wire bundle 18 and the integrated cable 20 with preferably, some additional room for the preferred filler material so that the filler material is continuous through body 44. The apertures 47, 48 are used as one way to vertically crisscross the wire bundle 18 and the integrated cable 20 down the length of seismic cable section 10a as shown in FIG. 1. There are other methods which can support a vertical crisscrossing pattern unitl the body member 44 using the preferred filler material sets such as supporting the crisscrossing pattern with a fastener located between the wire bundle 18 or the integrated cable 20 and a stress member 21. An example of a type of fastener that could be used is a tie wrap. Another method is to use inserts to support the crisscrossing pattern of the wire bundle and/or the integrated cable until the elastomeric body member 44 sets.

One of the purposes of spacer 16, as discussed previously, is to hold the stress members 21, the integrated cable 20, the wire bundle 18 and the seismic cable section cover 14 in place while the elastomeric filler material sets. In current designs for oil filled cable, it is necessary to prevent the spacer from moving due to stresses imposed on stress members when a seismic cable section is placed on a cable reel as described earlier. This requires that the spacer be firmly attached to the stress member during construction. The present invention does not require spacer 16 to be secured firmly to the stress member during construction. A shim within the stress member passage 46 or a crimp on the stress member on both sides of the spacer 16 can be used to hold the spacer 16 in place when the filler material is initially poured into the seismic cable section assembly. After the filler material sets, the spacer 16 as well as other internal seismic cable section 10a components, including detectors external to the wire bundle, will be held in place by the hardened body member 44.

Referring now to FIG. 4, a side cross-sectional view of a bottom seismic cable section 50 adapted for the detection of particle motions on the vertical, inline, and crossline components of the vector wave field is shown. In a preferred embodiment shown in FIG. 4, the bottom seismic cable section 50 also has the capability to detect compressional waves (p-waves) as indicated by the presence of inline pressure detector 22 which is usually a hydrophone. It is well known in the art that by comparing p-waves to s-waves which have reflected from the same interface additional information can be determined about the underlying substrata. Therefore, a preferred embodiment of the bottom seismic cable has the dual capability to detect with pressure sensors p-waves and to detect all three vectorial components of the wave field with motion detectors. The p-wave data collected by the pressure sensor (hydrophone) can be jointly processed with the motion detector orthogonal data as a preferred method to determine specific values for p-waves and $S_1$ and $S_2$ waves. The only major differences in the construction of the preferred bottom seismic cable section 50 and seismic cable section 10a shown in FIG. 2 is the addition of bottom spacers 52, the addition of mounts 53 and 57 which contain detectors which detect the particle motion of p- and s-waves, and the use of a filler material which in the preferred embodiment has a density greater than water.

Referring now to FIG. 5, a perspective view of bottom spacer 52 is shown. Preferably, a bottom spacer, such as shown by 52, is used when a seismic cable section is adapted for use as a bottom seismic cable section 50 for the detection of particle motion resulting from p- and s-waves. It performs the same functions as spacer 16, but also has the additional duties of holding a motion detector in place and acting as a couple between the bottom and the motion detector. Bottom spacer 52 is usually made of a heavy material which will not deform under temperature and pressure changes, such as brass. The heavy material ensures better coupling of bottom seismic cable section 50 to the bottom.

Bottom spacer 52 has stress member passages 46 which are provided for stress members 21 to pass through. In the preferred embodiment, in a configuration such that with the bottom cable section 50 extending longitudinally, two stress member passages 46 are positioned longitudinally within the bottom spacer in a configuration such that the stress member passages are positioned at least near a horizontal plane extending through the center line of bottom cable section 50 with each stress member passage 46 located approximately an equal distance from the center line of bottom cable section 50 for stress members 21 to pass through. The stress member passages hold stress members 21 in place at their preferred location until the preferred filler material sets, which in this case, preferably, is a filler material that has a density greater than water.

It is possible for more than two stress members to be used to construct bottom seismic cable section 50. The most likely case would be, in a configuration such that, with the bottom cable section extending horizontally, for an even number of stress members to be positioned at least near a horizontal plane extending through the center line of the bottom cable section with half of the stress members located on each side of the center line.

An upper aperture 60, shown in FIG. 5, is provided for the wire bundle 18 and integrated cable 20 to pass through. A pressure cylinder aperture 62 is provided to support a mount. The type of mount shown in FIG. 5 is an inline mount 53, another mount type can be located here as described hereinafter. Preferably, the pressure cylinder aperture 62 should be centrally located between stress members 21 as shown in FIG. 5.

As mentioned heretofore, a preferred embodiment of the bottom cable detects vectorial components of p- and s-waves on an orthogonal coordinate system. To define such a suitable coordinate system, 3 detectors are used which are aligned at right angles to each other. The motion detectors form the ordinates of the coordinate system. One detector is mounted inline with the length of the bottom cable so that particle motion along the length of the cable can be detected. Two detectors are aligned to detect motion which moves across the width of the cable. One detector is mounted crossline to detect motion horizontally across the width of the bottom cable and another vertical to detect motion in a vertical direction across the width.

A description of how some embodiments of this invention can be adapted to sense particle motion is herein provided. Referring first to FIG. 6, a side partial cut away view of FIG. 5, bottom spacer 52 is shown with an inline mount 53. The inline mount contains a motion detector 54, usually a conventional geophone, which is installed in the inline mount 53 in a manner such that the motion detector will detect the inline vectorial components of the p- and s-waves, i.e., the components which move inline with the length of the cable.

The inline mount 53 has a pressure cylinder with high pressure feed through to terminals 56 for electrical connections and the pressure cylinder is built as is known in the art to withstand the pressure of the operating depth of bottom seismic cable section 50. A metal such as stainless steel can be used to make the mount to ensure better coupling to the bottom because of the additional weight. The pressure cylinder is usually filled with oil or some other liquid to enhance the coupling between the motion detector and the pressure cylinder and also to help the cylinder withstand external pressure. In a preferred embodiment at one end of the inline mount 53 (a terminal end), the pressure cylinder has a recess 55 and within the recess are terminals 56 for wire connections.

FIG. 6 shows that inline mount 53 is mounted within pressure cylinder aperture 62. The diameter of the pressure cylinder aperture 62 should be about the diameter of the pressure cylinder. The shape of the upper aperture 60 as previously discussed is not critical; however the bottom spacer with the mount installed preferably should have a greater mass below the stress member passage 46 than above it, this will ensure that the bottom seismic cable section 50 will not roll as it is placed on the bottom.

FIG. 6 also shows, in a preferred embodiment, a wire duct 64 cut between the upper aperture 60 and the pressure cylinder aperture 62. The wire duct 64 is used as a wire path for a connection between the wire bundle 18 and terminals 56 in recess 55. The recess 55 end (terminal end) of the inline mount 53 is pushed into the pressure cylinder aperture 62 to a point just before the outside casing of the inline mount 53 reaches wire duct 64 as shown in FIG. 6. The inline mount 53 is then secured in place by epoxy or some other adhesive material which upon setting will bind the pressure cylinder in place and provide coupling between the cylinder and bottom spacer 52.

Figure 7:
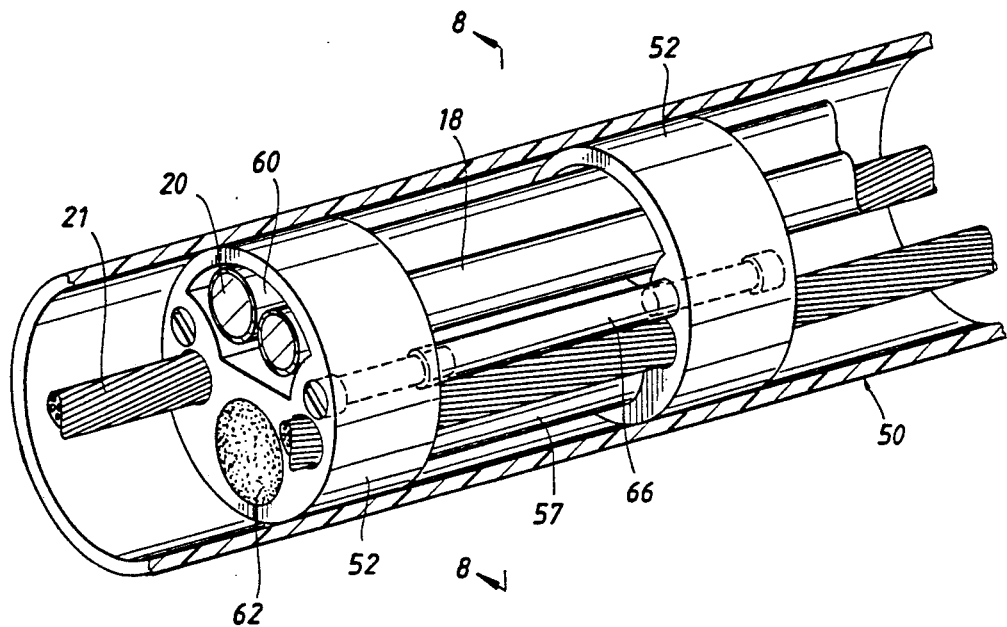
FIG. 7 is a perspective view of the mounting of a crossline motion detector in an embodiment of the invention.

Referring now to FIG. 7 a perspective view of a horizontal crossline mount 57 mounted between two bottom spacers 52 is shown. The crossline mount shown can detect the crossline vectorial components of p- and s-waves, i.e., waves which move in a direction horizontally across the width of the cable section. Also, to be discussed hereinafter, a crossline mount configuration can also be used to detect the vertical components of p- and s-waves which move vertically with respect to the width of the cable section. The motion detected by a crossline mount configuration depends upon the orientation of the motion detector within the pressure cylinder.

When laying a bottom cable on an approximately horizontal surface, the cable could roll before it comes to rest. To ensure that the vertical and crossline component detectors have the same orientation with respect to other vertical and crossline detectors along the length of the bottom cable and also to ensure that "vertical" and "horizontal" orientation are retained with respect to gravity, the vertical and crossline detectors are mounted within the crossline mounts on single axis gimbals in a preferred embodiment. The single axis is located to be in parallel with the horizontal center line of the bottom cable.

Figure 8:
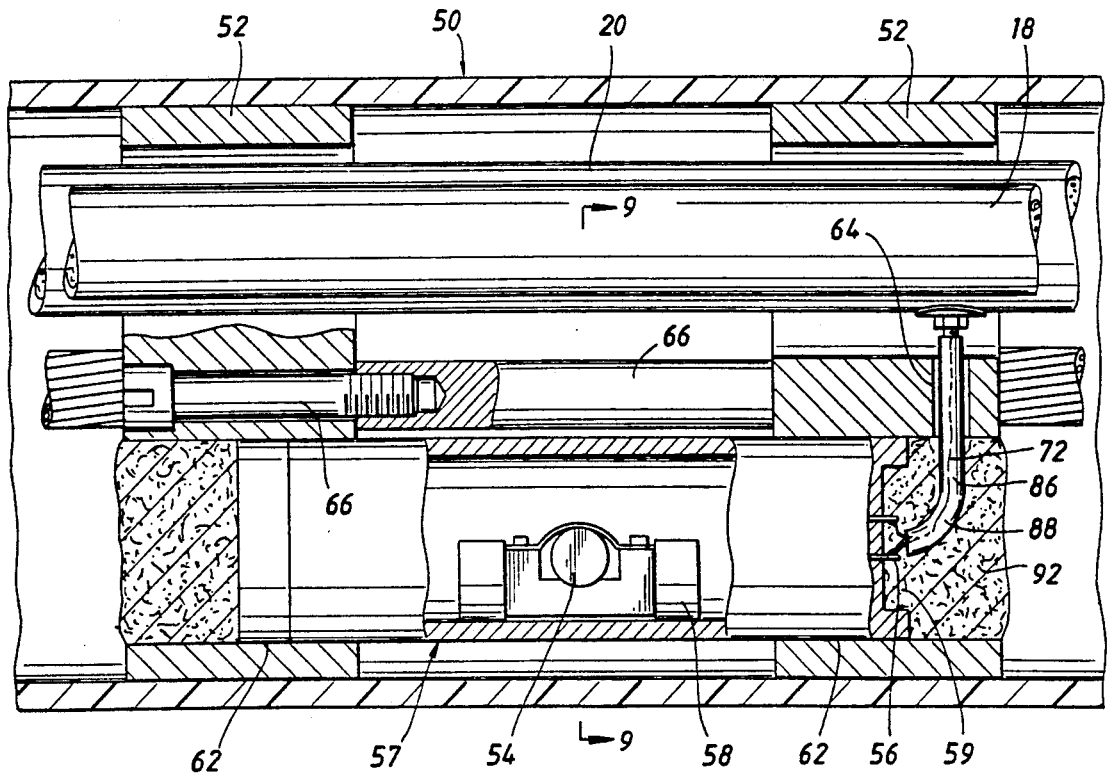
FIG. 8 is a partial cut away side view taken at section 8—8 of FIG. 7 showing a gimbal mounted motion detector.

FIG. 8 is a side partial cut away view of FIG. 7 and shows that horizontal crossline mount 57 contains a motion detector (geophone) 54 mounted on single axis gimbal 58. The mounting of the motion detector 54 as depicted, i.e., horizontal with respect to gravity and perpendicular to the length of the cable section, will enable the sensing of the crossline vectorial component, i.e., the horizontal crossline components of the p- and s-waves which move across the width of the bottom cable.

Figure 9A:
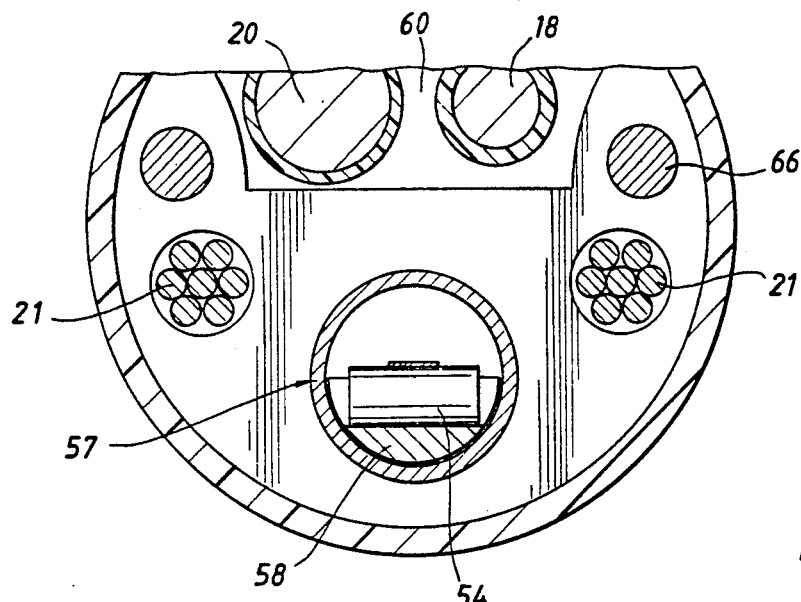
FIG. 9A is a partial cut away front view taken at section 9—9 of FIG. 8 showing a gimbal mounted motion detector.

FIG. 9A is a front partial cut away view of the crossline mount of FIG. 7 and FIG. 8, showing gimbal 58 and motion detector 54. The motion detector 54 is aligned on gimbal 58 to detect motion in a horizontal direction across the width of the cable (body member).

Figure 9B:
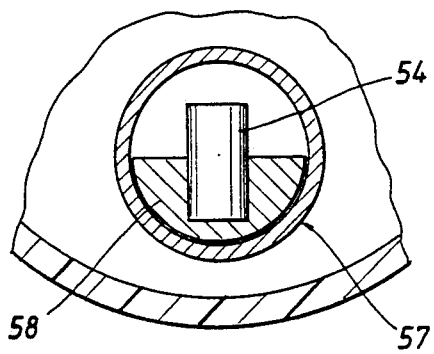
FIG. 9B is a partial cut away front view of an alternate method to mount a motion detector on a geophone in an embodiment of the invention.

FIG. 9B is similar to FIG. 9A; however FIG. 9B depicts a vertical crossline mount. A vertical crossline mount is configured to detect the motion of the vertical vectorial component of the p- and s-waves. The motion detector 54 is depicted as aligned on gimbal 58 vertically and perpendicular to the length of the cable section for the detection of motion in a vertical direction with respect to gravity so that particle displacement in a vertical direction with respect to the width of the cable (body member) can be detected.

Returning to FIG. 8, crossline mount 57 (the description of the components of the horizontal crossline mount herein described and the termination and connection methods thereon applies equally to a crossline mount arranged as in FIG. 9B to detect vertical motion) has a pressure cylinder with high pressure feed through to terminals 56 for electrical connections and the pressure cylinder is built as is known in the art to withstand the pressure of the operating depth of the bottom seismic cable section 50. The crossline mount 57 is usually filled with oil or some other liquid to enhance coupling between the motion detector and the crossline mount 57 pressure cylinder and also to help the cylinder withstand external pressure. The material used for the pressure cylinder can be of a metal such as stainless steel to ensure better coupling between the crossline mount 57 and the bottom due to the additional weight of the metal. The addition of gimbal 58 does require a greater space in a pressure cylinder, consequently the crossline mount 57 for this preferred embodiment is somewhat longer than an inline mount 53. In a preferred embodiment of the crossline mount 57, as shown in FIG. 8, recess 59 serves the same purpose as recess 55 on the inline mount and contains terminations 56 for wire. Terminations 56 identify this end of the pressure cylinder as the termination end.

Referring again to FIG. 8, the mounting of a crossline motion detector is shown. Due to the additional length of the crossline mount 57 and the need to ensure that both sides on the mount 57 are coupled to the bottom, two bottom spacers 52 are joined by bolt 66 or equivalent connectors to firmly hold the bottom spacers 52 a set distance apart, bolt 66 is also depicted on FIG. 7. However, some forms of preferred filler material may be a firm enough solid upon setting, that it is not necessary to use bolts or connectors to hold bottom spacers 52 apart to support a crossline detector 57. In the preferred embodiment, an arrangement such as shown in FIG. 8 should be used to ensure that the body member 44 using the preferred filler material through continual use and internal movement of the body member 44 does not cause the crossline mount 57 to become decoupled from the pressure cylinder apertures 62. The arrangement of FIG. 8 is also the preferred mounting for a crossline motion detector if prior art insulating liquids are used as a body member 44.

It is also possible when using a preferred filler material of an embodiment which has a density greater than water to place the mount holding the motion detector within the body member without using bottom spacers as described heretofore. Preferably, the pressure cylinder will be made of a heavy material with the pressure cylinder located adjacent to the lower most portion of the cable section to enhance coupling to the bottom. This approach is particularly useful if the filler material used adjacent to the pressure cylinder is relatively dense and inelastic. However, the use of a bottom spacer as described heretofore in the preferred embodiment will ensure maximum coupling of the motion detector to the bottom to detect vectorial components of p- and s-waves.

Returning again to FIG. 8, in mounting crossline mount 57 to the pressure cylinder aperture 62 of both bottom spacers 52, the crossline recess 59 end of crossline mount 57 is installed in the pressure cylinder aperture 62 of one of the bottom spacers 52 with crossline mount recess, 59 coming to rest just before wire duct 64 so that a wire connection can be made between terminals 56 within recess 59 and the wire bundle 18 by way of wire duct 64. The opposite end of the crossline mount 57 is installed in the other bottom spacer 52. Again the mount 57 is securely coupled to the bottom spacers by an epoxy.

It is also suitable for a crossline mount 57 to be mounted to a single bottom spacer 52 if the mount is short enough to ensure adequate coupling between the motion detector 54 and the single bottom spacer 52.

The use of single axis gimbals is preferred for acquisition on surfaces (bottoms) which are approximately horizontal. However, if the line of acquisition has a substantial slope, the use of a two-axis gimbal, as shown in FIGS. 10A and 10B, with the inline 54a, vertical 54b, and crossline 54c motion detectors mounted thereon would ensure that the data can be acquired on an orthogonal coordinate system which has the same orientation with respect to gravity for all sensors.

Figure 10A:
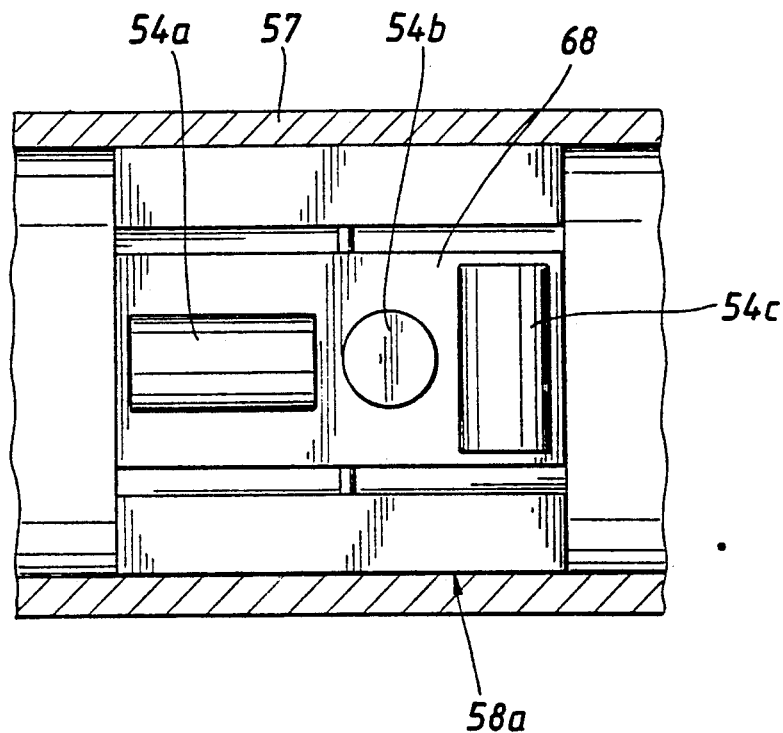
FIG. 10A is a top view of a two-axis gimbal.

FIG. 10A is a top view of gimbal 58a and shows one axis (the first axis) across the width of mounting platform 68.

Figure 10B:
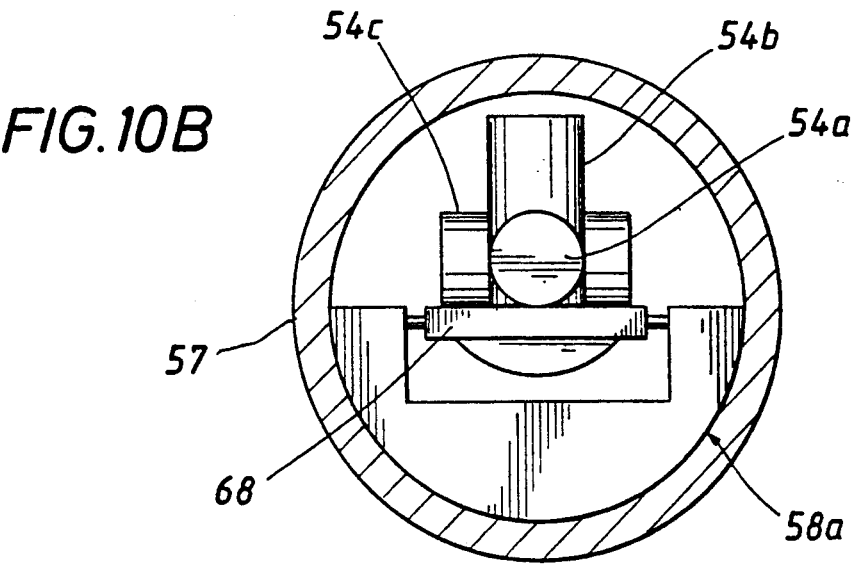
FIG. 10B is a front cross-section view of FIG. 10A.

FIG. 10B is a front cross-section view of gimbal 58a. It shows that platform 68 will maintain a horizontal position along the length of the platform and across the platform with respect to gravity. Gimbal 58a rotates about the longitudinal center line, i.e., the second axis, of the gimbal until the first axis is horizontal with respect to gravity. Platform 68 rotates about the first axis until the pull of gravity on the weight of platform 68 below the first axis holds the platform horizontally with respect to gravity along the length of platform 68.

Since the platform can be maintained at a horizontal across the surface and along the length of the surface, the platform can be used to mount motion detectors which, if aligned along the orthogonal axes on the platform, will maintain an orthogonal orientation for any slope within the pivot range of the first axis.

This arrangement, preferably, would be enclosed within a pressure cylinder as heretofore described in relation to inline and crossline mounts. A preferred arrangement would be to use a crossline-type mount to maximize the coupling to the bottom. However, if the geophones/two-axis gimbal arrangement is made small enough, the shorter inline-type mounting could be used, i.e., mounted to a single bottom spacer or the pressure cylinder could be installed directly into the bottom cable as described heretofore without the use of a bottom spacer.

It should also be noted that even on a sloping surface, the bottom cable as described previously using single-axis gimbals could still obtain data which can be converted to an orthogonal coordinate system with axes which are vertical and horizontal with respect to gravity. The slopes along the line of acquisition can be determined by onboard equipment. The location of the detectors is known. With the slope known in the area of acquisition, the data can then be processed to obtain the orthogonal equivalents for data detected by each detector.

Figure 11:
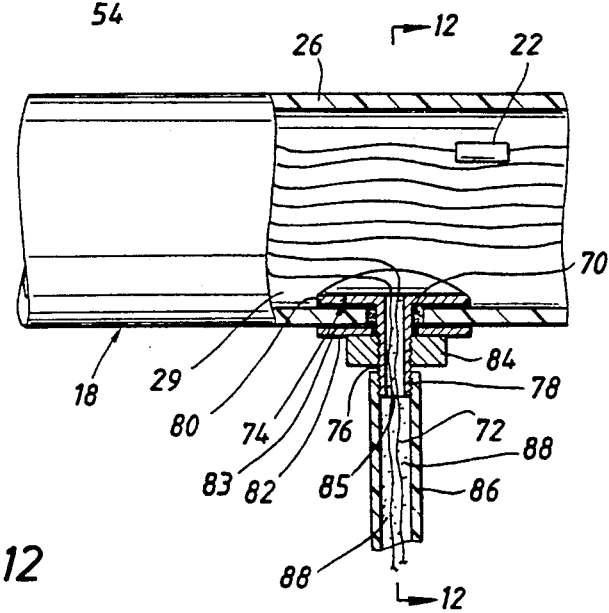
FIG. 11 is a partial cut away side view of a seal on a wire bundle in one preferred embodiment of the invention.

Referring now to FIG. 11, a preferred method to seal the wire bundle cover 26 after a portion of wire 72 (connection wire or wires) is taken outside of wire bundle 26 to terminate to an electrical component is shown. Other methods may be used; however, this method has been found to be easy to implement and have consistent results as an assembly process. In addition, the seal and wire termination method provides excellent protection for a wiring connection due to the small movement encountered in a preferred embodiment of the present invention by the movement of the hardened body member 44.

Figure 12:
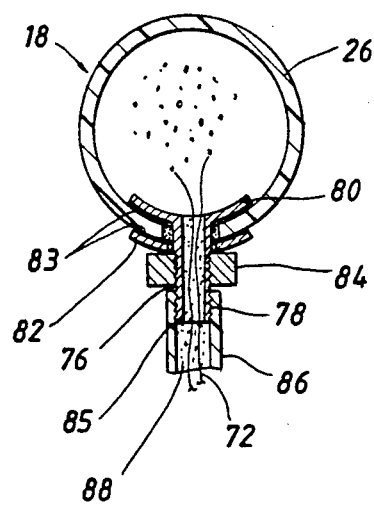
FIG. 12 is a front cut away view taken at section 12—12 of FIG. 11.

An opening 70 is made in the wire bundle cover 26. The connecting wire or connecting wires 72 that are to be terminated outside of the wire bundle cover is pulled through opening 70 and cut to provide a connecting end for the connection of the portion of wire outside of the wire bundle to terminals on a detector. An insert 74 with a hollow extension 76 is placed over wire 72. In a preferred embodiment, the hollow extension 76 is cylindrical in shape. The insert 74 is then placed through opening 70 to the interior of the wire bundle 18. The base 80 of the insert is flexible and shaped so that it can snug up against the wire bundle cover as shown in FIG. 12 which is a front cross sectional side view of FIG. 11.

In a preferred embodiment, a complementary section 82 with a hole for extension 76 to pass through is then placed over the insert 74 on the outside of the wire bundle cover 26. An epoxy, urethane or some other equivalent sealing compound 83 (a second sealing compound, a first sealing compound is discussed hereinafter) is then placed between the wire bundle cover 26, base 80 of the insert 74 and complementary section 82 for adhering the base 80 and the complementary section 82 to the wire bundle cover 26, and upon setting to provide a sealing material. In a preferred embodiment, a material which has been found to provide good adhesion and a good seal is 3M Scotch-Weld 3535, a semi-hard fast drying, white urethane adhesive sealing compound made by the Minnesota Mining and Manufacturing Co., 3M Center, St. Paul, Minn.

To compress the sealing compound 83, complementary section 82 and base 80 against the wire bundle cover, a clamp can be used; however, in a preferred embodiment the hollow cylindrical extension 76 also has screw treads 78 on its exterior. A nut 84 is tightened down on the hollow extension screw threads 78 to hold the base 80, sealing compound 83 and complementary section 82 against the wire bundle cover 26 to seal opening 70.

A sealing compound 85 (first sealing compound) is preferably also placed within the hollow portion of extension 76 to seal this opening to the wire bundle 18. In a particularly preferred embodiment, a sealing compound which has been found to be effective in sealing this opening is 3M ScotchWeld Brand Epoxy Adhesive 2216 B/A Gray, a semi-hard gray modified structural adhesive made by the Minnesota Mining and Manufacturing Co., 3M Center, St. Paul, Minn.

After a portion of wire exits a seal on wire bundle 18 it can be located adjacent to electrical components for termination; however due to small movements of the body member 44 using the preferred filler material within the seismic cable section a method of termination of the portion of wire outside of the wire bundle to electrical components are hereinafter disclosed.

The portion of wire (connection wire) 72, as shown on FIGS. 11 and 12, after exiting the seal on wire bundle 18, is inserted into a first end of a tube 86 which has a circumference substantially the same as the outer circumference of extension 76. The first end of the tube 86 is then glued to extension 76. The tube 86 can be made of the same material as the wire bundle cover 26 and it, preferably, is covered on the outside with oil or grease to prevent binding if the tube 86 material has a tendency to bind to body member 44 as discussed previously.

Preferably, at the second end of tube 86 a tube filler material 88 is placed into tube 86. The tube filler material 88 should be pourable but upon setting becomes a soft flexible material which will not readily flow out of the tube. In a preferred embodiment, a material which has been found to serve this function is the two part electrical and sealing compound 3M Scotchcast 2114, part A contains dimer diisocyanate (68239-06-5) and part B contains polybutadiene (9003-17-2), made by the Minnesota Mining and Manufacturing Co., 3M Center, St. Paul, Minn., which upon setting becomes a soft resilient potting compound.

Referring again to FIG. 11, the connection of an inline detector 22 (typically a pressure detector) to a wire within wire bundle 18 is shown.

Figure 13:
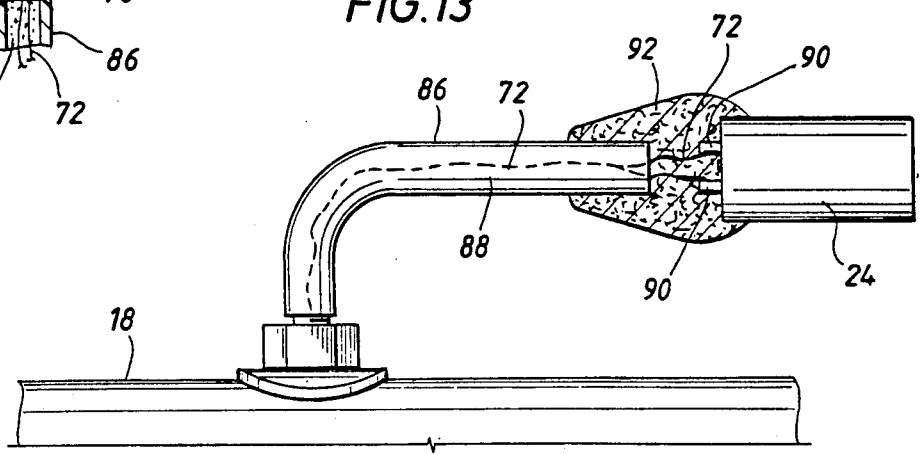
FIG. 13 is a partial cut away side view of the termination between a wire bundle and a detector located outside of a wire bundle in one preferred embodiment of the invention.

Referring now to FIG. 13, a preferred method of connecting the portion of wire outside of the wire bundle (connection wire) 72 to detector 24 is shown. Detector 24 could be any component which can be located outside of the wire bundle but within the body member such as a transponder, a motion detector, pressure transduce or specialized instrumentation. Connecting wire 72 (the portion of wire outside of the wire bundle) is shown emerging from tube 86 adjacent to and connecting to terminals 90 on the detector 24. The terminals 90, the end of tube 86 and the connecting end of the connecting wire are also shown covered by a potting compound 92 to insulate the connection from water intrusion.

Preferably, a potting material which will cure to a semi-hard potting compound 92 is used. The use of a semi-hard material ensures that wire will have some flexibility near terminals 90 so that small movements of the body member 44 using the preferred filler material will not place any force on the wire connection to the terminal 90 to cause it to break. In addition, a semi-hard potting compound 92 will be pliable and stick to terminals 90 to provide insulation in the event of water leakage into the interior of the cable section. In a preferred embodiment, a material which has been found to be effective as a potting compound is 3M Scotchcast Brand Electrical Resin 8 (5236) a two-part room-cured semiflexible unfilled epoxy liquid resin made by the Minnesota Mining and Manufacturing Co., 3M Center, St. Paul, Minn.

Referring again to FIG. 6, a preferred termination to inline mount 53 is shown. The portion of wire outside the wire bundle (connection wire 72) is placed within tube 86 as discussed previously. Preferably, the method of termination is made by passing tube 86, after the tube filler material 88 has cured, through wire duct 64. Termination of the connecting end of connection wire 72 is made to terminals 56. In a preferred embodiment the, recess 55, the terminals 56, the end of connecting wire 72, the end of tube 86 and the remaining space in the pressure cylinder aperture 61 is then filled with a potting compound 92. However, in some configurations of an inline mount, a recess may not be used on the mount, in that case, the potting material may be placed such that it encompasses the terminals and the connecting end of the portion of wire outside of the wire bundle so that it may absorb the small movements of the preferred filler material near the terminals.

Referring again to FIG. 8, a termination to crossline mount 57 is shown. Connecting wire 72 is placed within tube 86 as described previously. Preferably, the method of termination is made by passing tube 86, after the tube filler material 88 has cured, through wire duct 64. Connection of connection wire 72 is made to terminals 56. The recess 59, the terminals 56, the end of connecting wire 72, the end of tube 86 and the remaining space in the pressure cylinder aperture 62 is then filled with a potting compound 92. As discussed heretofore with regard to inline mounts, in some configurations of crossline mount a recess may not be used, in that case the potting material may be applied to encompass the terminals and the connecting end of the portion of wire outside of the wire bundle.

In a preferred embodiment, the same type of potting compound 92 as used in the description to terminate the preferred embodiment of detector 24 is used in the connection of termination wire 72 to inline mount 53 and-/or crossline mount 57. The potting compound being semi-hard will provide some flexibility in the wiring and connection to prevent a small movement in body member 44 from disrupting the connection or causing the connection wire 72 to break.

Although the present invention has been described in terms of specific embodiments, it is anticipated that alterations and modifications thereof will no doubt become apparent to those skilled in the art. It is therefore intended that the following claims be interpreted as covering all alterations and modifications as fall within the true spirit and scope of the invention.

What is claimed is:

1. A marine seismic cable comprising:
    an elongated body member;
    a longitudinal plurality of wires located within the body member in a configuration such that with the elongated body extended horizontally the longitudinal plurality of wires forms a vertical crisscrossing pattern which rises above and falls below a horizontal center line of the body member, wherein the vertical crisscrossing pattern localizes compressional and tension forces along the longitudinal plurality of wires as the marine seismic cable is wound and stored on a storage reel; and stress members located longitudinally within the body member in a configuration having the stress members on opposite sides of the plurality of wires with each stress member being located approximately the same distance from the horizontal center line and also being positioned such that each said stress member is located to be approximately on a horizontal plane which would extend thorough the body member's horizontal center line, wherein the configuration of the stress members equalizes internal stresses within the body member as the marine seismic cable is wound and stored on a storage reel.

2. The marine seismic cable according to claim 1 wherein the body member comprises a flexible solid.

3. The marine seismic cable according to claim 1 wherein the body member comprises an elastomeric material.

4. The marine seismic cable according to claim 1 wherein the body member comprises a flexible solid having a higher specific gravity on the longitudinal lowermost portion of the body member than the specific gravity of the remaining portion of the body member.

5. The marine seismic cable according to claim 1, wherein the body member comprises a flexible solid having at least two parts with different specific gravities.

6. The marine seismic cable according to claim 1, further including a detector connected to at least one wire of the longitudinal plurality of wires, the detector being located in a configuration such that the vertical crisscrossing pattern places the detector on the horizontal centerline of the body member.

7. The marine seismic cable according to claim 1 wherein the stress members are twisted strands, each with a lay pattern representing a rotation of twist, the twisted strands being configured along the length of the body member with opposite lay patterns forming a counter-lay configuration whereby the counter-lay configuration reduces the tendency of the stress members to twist the seismic cable when the stress members are under tension.

8. A marine seismic cable section comprising:
an elongated body member;
a longitudinal plurality of wires located within the body member in a configuration such that with the elongated body member extending horizontally, the longitudinal plurality of wires forms a vertical crisscrossing pattern which rises above and falls below a horizontal center line of the body member, wherein the vertical crisscrossing pattern localizes compressional and tension forces along the longitudinal plurality of wires as the cable section is wound and stored on a storage reel, the plurality of wires being functional to conduct wave forms;
an electrical continuum operatively connected to the longitudinal plurality of wires and functional to transfer the waveforms away from the wires;

stress members located longitudinally within the body member in a configuration having the stress members on opposite sides of the plurality of wires with each stress member being located approximately the same distance from the horizontal center line and also being positioned such that each said stress member is located to be approximately on a horizontal plane which would extend through the body member's horizontal center line wherein the configuration of the stress members equalizes internal stresses within the body member as the cable section is wound and stored on a cable storage reel; and a structural continuum connected to the stress members to absorb and transfer tension away from the stress members.

9. The marine seismic cable section according to claim 8 wherein the body member comprises a flexible solid.

10. The marine seismic cable section according to claim 8 wherein the body member comprises an elastomeric material.

11. The marine seismic cable section according to claim 8 wherein the body member comprises a flexible solid having a longitudinal lowermost portion with a higher specific gravity than the specific gravity of the remaining portion of the body member.

12. The marine seismic cable section according to claim 8, wherein the body member comprises a flexible solid having at least two portions with different specific gravities.

13. The marine seismic cable section according to claim 8 wherein the stress members are twisted strands, each with a lay pattern representing a rotation of twist, the twisted strands being configured along the length of the body member with opposite lay patterns forming a counter-lay configuration, whereby the counter-lay configuration reduces the tendency of the stress members to twist the seismic cable section when the stress members are under tension.

14. The marine seismic cable section according to claim 8 further including:
a detector connected to the longitudinal plurality of wires, the detector being a pressure sensor;
a second detector connected to the longitudinal plurality of wires, the second detector being an inline mount having a motion detector, the inline mount being aligned within the body member to detect vectorial components of p- and s-waves in a direction along the length of the body member;
a third detector connected to the longitudinal plurality of wires, the third detector being a vertical crossline mount having a motion detector, the vertical crossline mount being aligned within the body member to detect vectorial components of p- and s-waves in a vertical direction with respect to the width of the body member; and
a fourth detector connected to the longitudinal plurality of wires, the fourth detector being a horizontal crossline mount having a motion detector, the horizontal crossline mount being aligned within the body member to detect vectorial components of p- and s-waves which move in a horizontal direction with respect to width of the body member.

15. The marine seismic cable section according to claim 8 wherein the longitudinal plurality of wires includes a wire bundle.

16. The marine seismic cable section according to claim 15 wherein the longitudinal plurality of wires also includes an integrated cable.

17. The marine seismic cable section according to claim 16 further comprising:

spacers located within the body member, each spacer having an upper aperture and a lower aperture for the wire bundle and the integrated cable to pass through, the spacer also having stress member passages for the stress members to pass through, the stress member passages being located longitudinally within the spacer in a configuration having the stress member passages on opposite sides of the body member's horizontal center line with each stress member passage being located approximately the same distance from the center line and also being positioned such that each said stress member passage is located to be at least near a horizontal plane which would extend through the body member's horizontal center line, the spacers being located longitudinally along the body member at selected intervals, the vertical crisscrossing pattern of the wire bundle and the integrated cable passing through the upper and lower aperture of the spacers, and the stress members passing through the stress member passages.

18. The marine seismic cable section according to claim 15 including:

a detector; and a connection between the detector and the wire bundle.

19. The marine seismic cable section according to claim 18 wherein the detector is connected to at least one wire of the wire bundle and the detector is located within the wire bundle in a configuration such that the vertical crisscrossing pattern of the wire bundle places the detector on the horizontal centerline of the body member.

20. The marine seismic cable section according to claim 18 wherein the detector is located outside of the wire bundle.

21. The marine seismic cable section according to claim 20 including:

a wire bundle cover which encompasses the wire bundle;

an opening in the wire bundle cover;

a wire within the wire bundle having a connecting end and also being electrically continuous with the wire bundle, the connecting end of the wire passing from the wire bundle through the opening thereby providing a portion of wire outside of the wire bundle;

terminals on the detector, wherein the connecting end of the wire connects to the terminals to form the connection between the detector and the wire bundle; and a seal for enclosing the opening.

22. The marine seismic cable section according to claim 21 wherein the seal has an insert positioned for covering the opening, a passage within the insert for passing the portion of wire outside the wire bundle through the opening, a first sealing compound located within the passage which is functional to close the passage, and a second sealing compound located between the insert and wire bundle cover which is functional to adhere the insert against the wire bundle cover.

23. The marine seismic cable section according to claim 22 wherein:

the insert of the seal has a base having a hollow extension attached, the base being positioned on the inside of the opening, the hollow extension protruding through the opening whereby the portion of wire outside of the wire bundle passes through the hollow extension;

the seal includes a complementary section positioned to cover the outside of the opening, the complementary section having a hole for the extension to pass through;

the second sealing compound is located between the base, the complementary section and the wire bundle cover;

the seal also includes a means for compressing the base, complementary section and second sealing compound against the wire bundle cover; and the first sealing compound is located within the hollow extension whereby the hollow cylindrical extension is closed.

24. The marine seismic cable section according to claim 23 wherein the means for compressing the insert, complementary section, and second sealing compound against the wire bundle cover includes screw threads on the hollow extension and a nut positioned on the screw threads to exert a compression force on the inset, complementary section, wire bundle cover and second sealing compound.

25. The marine seismic cable section according to claim 21 including a tube which encompasses the portion of wire outside the wire bundle, the tube having one end connected to the seal.

26. The marine seismic cable section according to claim 25 further comprising a filler material which is placed within the tube.

27. The marine seismic cable section according to claim 20 wherein the detector has a means for detecting particle motion caused by p- and s-waves.

28. The marine seismic cable section according to claim 20 wherein:

the detector is a mount, the mount having a motion detector for the detection of vectorial components of p- and s-waves and a pressure cylinder which is functional to enclose and support the motion detector.

29. The marine seismic cable section according to claim 28 including:

a bottom spacer located within the body member, the bottom spacer having an upper aperture for the wire bundle to pass through and a pressure cylinder aperture, the bottom spacer also having stress member passages for the stress members to pass through, each stress member passage being located longitudinally within the bottom spacer in a configuration having the stress member passages on opposite sides of the body member center line with each stress member passage being located approximately the same distance from the center line and also being positioned such that each said stress member passage is located to be at least near a horizontal plane which extends through the body member's horizontal center line, the bottom spacer being located longitudinally along the body member at a selected location, the vertical crisscrossing pattern of the wire bundle passing through the upper aperture of the bottom spacer, the stress members passing through the stress member passages of the bottom spacer, and the mount being mounted to the pressure cylinder aperture.

30. The marine seismic cable section according to claim 29 wherein the pressure cylinder aperture of the bottom spacer is centrally located between the stress members.

31. The marine seismic cable section according to claim 29 wherein:
the mount is an inline mount, the inline mount having the motion detector functionally oriented within the pressure cylinder to detect vectorial components of p- and s-waves in a longitudinal direction with respect to the length of the pressure cylinder, the inline mount being mounted to the pressure cylinder aperture of the bottom spacer such that the motion detector can detect the vectorial components of p- and s-waves in a direction that is along the length of the body member.

32. The marine seismic cable section according to claim 29 wherein:
the mount is a crossline mount, the crossline mount having a gimbal within the pressure cylinder which is functional to orient the motion detector such that the motion detector can detect vectorial components of p- and s-waves in a direction across the width of the pressure cylinder, the crossline mount being mounted to the pressure cylinder aperture of the bottom spacer such that the motion detector can detect the vectorial components of p- and s-waves in a direction that is across the width of the body member.

33. The marine seismic cable section according to claim 32 wherein:
the mount is a vertical crossline mount, the motion detector being attached to the gimbal such that the motion detector is oriented to detect vertical vectorial components of p- and s-waves vertically with respect to the width of the crossline mount, the vertical crossline mount being mounted to the pressure cylinder aperture such that the motion detector can detect the vertical vectorial components of p- and s-waves in a direction that is vertical with respect to the width of the body member.

34. The marine seismic cable section according to claim 32 wherein:
the mount is a horizontal crossline mount, the motion detector being attached to the gimbal such that the motion detector is oriented to detect horizontal vectorial components of p- and s-waves horizontally with respect to the width of the crossline mount, the horizontal crossline mount being mounted to the pressure cylinder aperture such that the motion detector can detect the horizontal vectorial components of p- and s-waves in a direction that is horizontally across the width of the body member.

35. The marine seismic cable section according to claim 32 including:
two bottom spacers being located in proximity to each other to support the crossline mount; and
the crossline mount being mounted to the pressure cylinder apertures of the two bottom spacers.

36. The marine seismic cable section according to claim 21 wherein the detector is a mount, the mount including a motion detector which is functional for the detection of vectorial components of p- and s-waves and a pressure cylinder which is functional to enclose and support the motion detector.

37. The marine seismic cable section according to claim 36 further comprising:
a bottom spacer located within the body member, the bottom spacer having an upper aperture for the wire bundle to pass through and a pressure cylinder aperture, the bottom spacer also having stress member passages for the stress members to pass through, each stress member passage being located longitudinally within the bottom spacer in a configuration having the stress member passages on opposite sides of the body member center line with each stress member passage being located approximately the same distance from the center line and also being positioned such that each said stress member passage is located to be at least near a horizontal place which extends through the body member's horizontal center line, the bottom spacer being located longitudinally along the body member at a selected location, the vertical crisscrossing pattern of the wire bundle passing through the upper aperture of the bottom spacer, the stress members passing through the stress member passages of the bottom spacer, and the mount being mounted to the pressure cylinder aperture.

38. The marine seismic cable section according to claim 37 wherein:
the mount also includes having a terminal end where the terminals attached to an end of the mount;
the bottom spacer also includes a wire duct, the wire duct being located between the upper aperture and the pressure cylinder aperture;
the mount is mounted to the pressure cylinder aperture by placing the terminal end of the mount within the pressure cylinder aperture until it rests adjacent to the wire duct; and
the portion of wire outside of the wire bundle is positioned to pass through the wire duct such that the connecting end is adjacent to the terminals on the mount and connected to the terminals.

39. The marine seismic cable section according to claim 38 further including a potting compound which encompasses the terminals and the connecting end.

40. The marine seismic cable section according to claim 38 further including a tube which encompasses the portion of wire outside of the wire bundle, the tube having an end connected to the seal and an end adjacent to the terminals.

41. The marine seismic cable section according to claim 40 further including a filler material which is located within the tube.

42. The marine seismic cable section according to claim 41 further including a potting compound which encompasses the terminals, the connecting end and the end of the tube adjacent to the terminals.

43. The marine seismic cable section according to claim 38 further including:
the terminal end of the mount includes a recess, the recess having the terminals attached therein; and
a potting compound which fills the recess and encompasses the terminals and the connecting end.

44. The marine seismic cable section according to claim 43 further including:
a tube which encompasses the portion of wire outside of the wire bundle, the tube having an end connected to the seal and an end adjacent to the terminals; and
a filler material which is located within the tube.

45. The marine seismic cable section according to claim 15 wherein:

the structural continuum includes a coupler at each end of the body member and a connection between the stress members and each coupler.

46. The marine seismic cable section according to claim 15 wherein:
the electrical continuum includes a coupler at each end of the body member and a connection between the wire bundle and each coupler.

47. The marine seismic cable section according to claim 15 wherein:
the structural continuum includes a first coupler at one end of the body member and a means for connecting between the stress members and the coupler; and
the electrical continuum includes the coupler and a means for connecting between the wire bundle and the coupler.

48. The marine seismic cable section according to claim 47 wherein:
the means for connecting between the stress members and the coupler includes a stress relief section having a transition plug and stress relief members;
the transition plug is located within the body member and has a first side and a second side, the first side facing the coupler;
the transition plug also includes stress member connection points on the second side, the stress member connection points being located in a configuration having the stress member connection points on opposite sides of the body member's horizontal center line with each connection point being approximately the same distance from the body member's center line and also being positioned such that each connection point is located to be at least near a horizontal plane which would extend through the body member's horizontal center line;
the stress members are connected to the stress member connection points;
the transition plug also includes stress relief member connection points on the first side, the stress relief member connection points being configured in the same way as the stress member connection points;
the coupler includes coupler stress relief member connection points, the coupler stress relief member connection points being configured in the same way as the stress relief member connection points on the first side of the transition plug; and
the stress relief members are located between the coupler and the transition plug, the stress relief members being connected at one end to the coupler stress relief member connection points and on the other end to the stress relief member connection points on the transition plug.

49. The marine seismic cable section according to claim 47 wherein:
the means for connecting between the wire bundle and the coupler includes a transition plug and a stress relief wire bundle;
the transition plug is located within the body member and has a first side and a second side, the first side facing the coupler;
the second side has a wire bundle connection whereby the wire bundle is connected to the transition plug;
the first side has a stress relief wire bundle connection which has electrical continuity with the wire bundle connection;

the coupler has a coupler stress relief wire bundle connection; and
the stress relief wire bundle is located between the coupler and the transition plug, the stress relief wire bundle being connected at one end to the stress relief wire bundle connection and at the other end to the coupler stress relief wire bundle connection.

50. The marine seismic cable section according to claim 16 wherein:
the structural continuum includes a coupler at the one end of the body member and a means for connecting between the stress members and the coupler; and
the electrical continuum includes the coupler, a means for connecting between the wire bundle and the coupler and a means for connecting between the integrated cable and the coupler.

51. The marine seismic cable section according to claim 50 wherein:
the means for connecting between the integrated cable and the coupler includes a slack wire bundle and a transition plug;
the transition plug is located within the body member and has a first side and a second side, the first side facing the coupler;
the second side has an integrated cable connection whereby the integrated cable is connected to the transition plug;
the first side has a slack wire bundle connection which has electrical continuity with the integrated cable connection;
the coupler includes a coupler slack wire bundle connection; and
the slack wire bundle is located between the coupler and the transition plug, the slack wire bundle being connected at one end to the slack wire bundle connection on the transition plug and at the other end to the coupler slack wire bundle connection.

52. The marine seismic cable section according to claim 51 wherein the slack wire bundle includes a slack wire cover and wire disposed within the slack wire cover in a coil configuration, the coil configuration having a diameter and a length, the length of the coil configuration being extended longitudinally within the body member whereby the slack wire bundle connects the coupler to the transition plug.

53. The marine seismic cable section according to claim 16 wherein:
the structural continuum includes a coupler on one end of the body member and a means for connecting between the stress members and the coupler; and
the electrical continuum includes the coupler, and a means for connecting between the wire bundle, integrated cable and the coupler.

54. The marine seismic cable section according to claim 53 wherein:
the means for connecting between the wire bundle, integrated cable and the coupler includes a transition plug and a slack wire bundle;
the transition plug is located within the body and has a first side and a second side, the first side facing the coupler;
the second side has a wire bundle connection and an integrated cable connection whereby the wire bundle and integrated cable are connected to the transition plug;

the first side has a slack wire bundle connection which has electrical continuity with the integrated cable connection and the wire bundle connection;

the coupler has a coupler slack wire bundle connection; and the slack wire bundle is located between the coupler and the transition plug, the slack wire bundle being connected at one end to the slack wire bundle connection and at the other end to the coupler slack wire bundle connection.

55. A method for making a marine seismic cable section comprising an elongated body member encompassing longitudinally extending stress members, a plurality of wires functional to conduct wave forms, couplers functional to absorb longitudinal stress on the stress members and to conduct wave forms and longitudinal stress outside of the cable section, and detectors connected to the wires, comprising in combination the steps of:

(a) connecting a detector to a wire within the longitudinal plurality of wires;

(b) spacing two separated couplers in a configuration such that when the two couplers are positioned on a horizontal surface, the centerpoint of each coupler defines a horizontal center line between the centerpoints of the couplers;

(c) disposing the detector and the longitudinal plurality of wires between the two couplers, the wires being disposed in a configuration such that, when the wires are extended along the horizontal centerline between the couplers, the wires form a vertical crisscrossing pattern which rises above and falls below the horizontal center line, the vertical crisscrossing pattern thereby enabling the localization of compressional and tension forces along the longitudinal plurality of wires when the cable section is wound and stored on a cable storage reel;

(d) disposing a stress member longitudinally on each side of the detector and the wires in a configuration having each stress member on opposite sides of the longitudinal plurality of wires each said stress member being located approximately equidistant from the horizontal center line and also being positioned such that each said stress member is located to be approxmately on a horizontal plane which would extend through the horizontal center line, the configuration thereby enabling the equalization of internal stresses within the body member when the cable section is wound and stored on a cable storage reel;

(e) connecting the longitudinal plurality of wires to the couplers to establish electrical continuity;

(f) connecting the stress members to the couplers to establish structural continuity; and (g) forming a body member between the couplers a body member which encompasses the detector, wiring and the stress members.

56. The method for making a marine seismic cable according to claim 55 wherein step (g) includes forming the body member from an elastomeric material.

57. The method for making a marine seismic cable according to claim 55 wherein step (g) includes forming the body by utilizing a resin which is initially pliable when forming the body member and upon setting is a solid which has a flexible uniform density.

58. The method for making a marine seismic cable according to claim 55 wherein step (d) includes utilizing twisted strands, each having a lay-pattern representing the rotation of twist for each stress member and disposing each stress member in a configuration such that a counter-lay configuration will be formed between the stress members.

59. The method for making a marine seismic cable according to claim 55, wherein step (a) includes utilizing a wire bundle which comprises at least a portion of the longitudinal plurality of wires with the wire located within the wire bundle.

60. The method for making a marine seismic cable according to claim 59, wherein step (a) includes positioning the detector within the wire bundle.

61. The method for making a marine seismic cable according to claim 60, wherein step (c) includes disposing the detector and wire bundle along the horizontal center line in a configuration such that the vertical crisscrossing pattern locates the detector on the horizontal center line.

62. The method for making a marine seismic cable according to claim 55, wherein step (c) includes utilizing spacers at selected intervals between the couplers for disposing the longitudinal plurality of wires in the vertical crisscrossing pattern.

63. The method for making a marine seismic cable according to claim 62, wherein step (c) includes utilizing spacers having a configuration such that when a spacer is located between the couplers, the spacer has an upper and a lower aperture for the wires to pass through and also has stress member passages for the stress members to pass through, the stress member passages being located longitudinally within the spacer in a configuration having the stress member passages on opposite sides of the horizontal center line with each stress member passage being located approximately an equal distance from the center line and also being positioned such that each said stress member passage is located to be at least near a horizontal plane which would extend through the horizontal center line.

64. The method for making a marine seismic cable according to claim 59, further including the steps of:

(h) enclosing the wire bundle with a wire bundle cover;

(i) separating a portion of the wire bundle cover to form an opening;

(j) cutting the wire to form a connecting end;

(k) removing a portion of the wire from the wire bundle by passing the connecting end through the opening;

(l) positioning the detector outside of the wire bundle (m) connecting the connecting end to the detector by utilizing terminals on the detector for a connection to the connecting end; and (n) sealing the opening.

65. The method for making a marine seismic cable according to claim 64, wherein:

step (n) includes sealing the opening by placing an insert within the opening, the insert having a passage for the connecting end to pass through;

step (k) includes passing the connecting end through the passage; and step (n) also includes utilizing a first sealing compound within the passage for sealing the passage, and sealing the opening by utilizing a second sealing compound between the insert and the wire bundle cover for adhering the inset to the wire bundle cover.

66. The method for making a marine seismic cable according to claim 65, wherein:

step (n) includes sealing the opening by utilizing a base with a hollow extension attached for the insert and positioning the base on the inside of the wire bundle cover thereby covering the opening with the hollow extension protruding through the opening;

step (k) includes passing the connecting end through the hollow extension; and step (n) also includes sealing the opening by utilizing a complementary section having a hole for the hollow extension to pass through for covering the outside of the opening, sealing the hollow extension by utilizing the first sealing compound to seal the hollow extension, and utilizing the second sealing compound for adhering the complementary section and the base to the wire bundle cover.

67. The method for making a marine seismic cable according to claim 66, wherein step (n) includes compressing the complementary section, base, second sealing compound and wire bundle cover together to enhance adhesion.

68. The method for making a marine seismic cable according to claim 67, wherein step (n) includes utilizing screw threads on the hollow extension and a tightened nut on the screw threads for compressing the complementary section, base, second sealing compound and wire bundle cover together to enhance adhesion.

69. The method for making a marine seismic cable according to claim 65, further including the steps of:
(o) enclosing with a tube the portion of wire outside of the wire bundle between the terminals and the insert; and
(p) attaching the tube to the insert.

70. The method for making a marine seismic cable according to claim 69, further including the step of (q) filling the tube with a filler material.

71. The method for making a marine seismic cable according to claim 64 further including the steps of:
(o) utilizing for the detector in step (a) a mount wherein the mount includes a means for detecting vectorial components of p- and s-waves;
(p) utilizing a bottom spacer located between the couplers in proximity to the opening in the wire bundle; and
(q) mounting the mount to the bottom spacer whereby the mount will be coupled to the bottom to detect vectorial components of p- and s-waves.

72. The method for making a marine seismic cable according to claim 71, wherein:
step (p), includes utilizing for the bottom spacer a configuration such that when the bottom spacer is positioned between the couplers, the bottom spacer has an upper aperture for the longitudinal plurality of wires to pass through, a pressure cylinder aperture for mounting the mount, and stress member passages, the stress member passages being located longitudinally within the bottom spacer in a configuration having the stress member passages on opposite sides of the horizontal center line with each stress member passage being located approximately an equal distance from the centerline and also being positioned such that each said stress member passage is located to be at least near a horizontal plane which would extend through the horizontal center line.

73. The method for making a marine seismic cable according to claim 72, wherein:

step (o) includes utilizing a first mount end on the mount, the first mount end having a recess;

step (m) includes the terminals being attached to the first mount end within the recess;

step (p) includes also utilizing a wire duct, the wire duct being formed between the upper aperture and the pressure cylinder aperture;

step (q) includes mounting the mount to the bottom spacer by placing the first mount end into the pressure cylinder aperture until the first mount end is adjacent to the wire duct; and step (k) includes positioning the portion of the wire outside of the wire bundle so that it passes through the wire duct and the connecting end is adjacent to the terminals.

74. The method for making a marine seismic cable according to claim 73, further including the step of (r) filling the recess and covering the terminals and the connecting end with a potting compound.

75. The method for making a marine seismic cable according to claim 73, further including the step of (s) enclosing the portion of wire outside of the wire bundle with a tube.

76. The method for making a marine seismic cable according to claim 75, further including the step of (t) filling the tube with a filler material.

77. The method for making a marine seismic cable according to claim 73, wherein:
step (o) includes utilizing a pressure cylinder and a motion detector for the mount, the pressure cylinder having a terminal end, and the motion detector being enclosed within the pressure cylinder; and
step (m) includes attaching the terminals to the terminal end of the pressure cylinder.

78. The method for making a marine seismic cable according to claim 77, further including the step of (r) covering the terminals and connecting end with a potting compound.

79. The method for making a marine seismic cable according to claim 77, wherein step (o) includes utilizing an inline mount for the mount, the inline mount being formed by enclosing the motion detector within the pressure cylinder such that the motion detector can detect vectorial components of p- and s-waves in a direction longitudinal to the length of the pressure cylinder.

80. The method for making a marine seismic cable according to claim 72, wherein:
step (p) includes utilizing two bottom spacers, the bottom spacers being a first and a second bottom spacer with the first bottom spacer located in proximity to the opening in the wire bundle and the second bottom spacer located in proximity to the first bottom spacer, the first bottom spacer also having a wire duct between the upper aperture and the pressure cylinder aperture; and
step (o) includes utilizing a crossline mount for the mount, the crossline mount being formed by mounting a motion detector on a gimbal and enclosing the gimbal within a pressure cylinder, the pressure cylinder having a terminal end, the motion detector being mounted on the gimbal such that it can detect vectorial components of p- and s-waves in a direction across the width of the pressure cylinder;
step (m) includes attaching the terminals to the terminal end of the pressure cylinder;

step (q) includes mounting the crossline mount to the bottom spacers by placing the terminal end into the pressure cylinder aperture of the first bottom spacer until the terminal end is adjacent to the wire duct, and placing the opposite end of the pressure cylinder within the pressure cylinder aperture of the second bottom spacer; and step (k) includes positioning the portion of the wire outside of the wire bundle so that it passes through the wire duct of the first bottom spacer and the connecting end is adjacent to the terminals.

81. The method for making a marine seismic cable according to claim 80, further including the step of (r) covering the terminals and connecting end with a potting compound.

82. The method for making a marine seismic cable according to claim 59, wherein:

Step (a) includes utilizing an integrated cable which comprises at least a part of the longitudinal plurality of wires;

step (b) includes the two couplers being a first coupler and a second coupler;

step (e) includes connecting the wire bundle and the integrated cable to establish electrical continuity by utilizing a stress relief section between the wire bundle, integrated cable and the first coupler; and step (f) includes connecting the stress members to the first coupler to establish structural continuity by utilizing a stress relief section between the stress members and the first coupler.

83. The method for making a marine seismic cable according to claim 82, wherein step (e) includes assembling the electrical portion of the stress relief section by utilizing a slack wire bundle, a slack wired bundle connection on the first coupler and a transition plug, the transition plug having a first side and a second side, the second side having electrical connections for the wire bundle and the integrated cable, the first side having an electrical connection for the slack wire bundle, the wire bundle connection, integrated cable connection and slack wire bundle connection being connected within the transition plug, the transition plug being located between the first and second couplers with the first side of the transition plug in proximity to and facing the first coupler, the integrated cable being connected to the integrated cable connection and the wire bundle to the wire bundle connection on the second side, and the slack wire bundle being connected to the slack wire bundle connection on the first side and to the slack wire bundle connection on the first coupler.

84. The method for making a marine seismic cable according to claim 83, wherein step (f) includes assembling the remaining portion of the stress relief section by utilizing stress relief members, the stress members being connected on the second side of the transition plug to connection points, the connection points being located in a configuration having the stress member connection points on opposite sides of the body member's horizontal center line with each connection point being approximately the same distance from the body member's center line and also being positioned such that each said connection point is located to be at least near a horizontal plane which would extend through the body member's horizontal center line, and the stress relief members being connected between the first side of the transition plug and the first coupler in a configuration, such that when the stress relief section is located between the couplers, the connection points of the stress relief members on the first side and on the first coupler are positioned to be on opposite sides of the horizontal center line with each connection point also being located approximately the same distance from the centerline and also positioned such that each said stress relief member' connection point is located to be at least near a horizontal plane which would extend through the horizontal center line.

85. The method for making a marine seismic cable according to claim 83, wherein step (e), includes utilizing a slack wire bundle cover and a configuration having wire disposed in a coil configuration for the slack wire bundle, the coil configuration having a diameter and a length, the coil configuration being longitudinally positioned between the transition plug and the first coupler, and the coil configuration being enclosed by the wire within a slack wire bundle cover.

86. The method for making a marine seismic cable according to claim 82, wherein step (e), includes assembling the electrical portion of the stress relief section by utilizing a slack wire bundle, a stress relief wire bundle, a slack wire bundle electrical connection on the first coupler, a stress relief wire bundle electrical connection on the first coupler and a transition plug, the transition plug having a first side and a second side, the second side having electrical connections for the wire bundle and the integrated cable, the first side having electrical connections for the slack wire bundle and the stress relief wire bundle, the wire bundle connection being connected within the transition plug to the stress relief wire bundle connection, the integrated cable connection being connected within the transition plug to the slack wire bundle connection, the transition plug being positioned between the first and second couplers with first side of transition plug in proximity to and facing the first coupler, the integrated cable being connected to the integrated cable connection, the wire bundle being connected to the wire bundle connection, the slack wire bundle being connected to the slack wire bundle connections on the transition plug and the first coupler, and the stress relief wire bundle being connected to the stress relief wire bundle connections on the transition plug and the first coupler.

87. The method for making a marine seismic cable according to claim 86, wherein step (f), includes assembling the remaining portion of the stress relief section by utilizing stress relief members, the stress members being connected on the second side of the transition plug to connection points, the connection points being located in a configuration having the stress member connection points on opposite sides of the body member's horizontal center line with each connection point being approximately the same distance from the body member's center line and also being positioned such that each said connection point is located to be at least near a horizontal plane which would extend through the body member's horizontal center line, and the stress relief members being connected between the first side of the transition plug and the first coupler in a configuration, such that when the stress relief section is located between the couplers, the connection points of the stress relief members on the first side and on the first coupler are positioned to be on opposite sides of the horizontal center line with each connection point also being located approximately the same distance from the centerline and also positioned such that each said stress relief members' connection point is located to be at least near a horizontal plane which would extend through the horizontal center line.

* * * * *